(12) United States Patent
Takano et al.

(10) Patent No.: US 8,264,781 B2
(45) Date of Patent: Sep. 11, 2012

(54) ZOOM LENS, INFORMATION DEVICE, AND IMAGING APPARATUS

(75) Inventors: Yohei Takano, Yokohama (JP); Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/242,666

(22) Filed: Sep. 23, 2011

(65) Prior Publication Data
US 2012/0008216 A1 Jan. 12, 2012

Related U.S. Application Data

(62) Division of application No. 12/726,866, filed on Mar. 18, 2010, now Pat. No. 8,054,559.

(30) Foreign Application Priority Data

Mar. 18, 2009 (JP) ................................. 2009-065954

(51) Int. Cl.
*G02B 15/14* (2006.01)
(52) U.S. Cl. ....................................... 359/687
(58) Field of Classification Search .................. 359/676, 359/686, 687
See application file for complete search history.

(56) References Cited

U.S. PATENT DOCUMENTS

| | | | |
|---|---|---|---|
| 5,144,488 A * | 9/1992 | Endo et al. ..................... | 359/686 |
| 6,448,998 B1 | 9/2002 | Suzuki et al. | |
| 6,509,995 B1 | 1/2003 | Suzuki et al. | |
| 6,606,179 B2 | 8/2003 | Suzuki et al. | |
| 6,697,183 B2 | 2/2004 | Atsuumi et al. | |
| 6,771,407 B2 | 8/2004 | Hayashi et al. | |
| 6,781,729 B2 | 8/2004 | Suzuki et al. | |
| 6,791,729 B2 | 9/2004 | Atsuumi et al. | |
| 6,801,351 B2 | 10/2004 | Suzuki et al. | |
| 6,829,104 B2 | 12/2004 | Suzuki et al. | |
| 6,937,371 B2 | 8/2005 | Hayashi et al. | |
| 6,961,164 B2 | 11/2005 | Atsuumi | |
| 6,999,208 B2 | 2/2006 | Suzuki et al. | |
| 7,006,120 B2 | 2/2006 | Sakai et al. | |
| 7,012,724 B2 | 3/2006 | Atsuumi et al. | |
| 7,038,822 B2 | 5/2006 | Sakai et al. | |
| 7,050,210 B2 | 5/2006 | Atsuumi et al. | |
| 7,068,407 B2 | 6/2006 | Sakai et al. | |
| 7,106,483 B2 | 9/2006 | Hayashi et al. | |
| 7,126,737 B2 | 10/2006 | Atsuumi et al. | |
| 7,154,651 B2 | 12/2006 | Atsuumi et al. | |
| 7,164,516 B2 | 1/2007 | Hayashi et al. | |
| 7,236,281 B2 | 6/2007 | Hayashi et al. | |
| 7,271,823 B2 | 9/2007 | Izumi et al. | |

(Continued)

FOREIGN PATENT DOCUMENTS

JP 2004-199000 7/2004
(Continued)

*Primary Examiner* — Darryl J Collins
(74) *Attorney, Agent, or Firm* — Oblon, Spivak, McClelland, Maier & Neustadt, L.L.P.

(57) ABSTRACT

A zoom lens includes a first lens group having a positive refracting power, a second lens group having a negative refracting power, a third lens group having a positive refracting power, and a fourth lens group having a positive refracting power, being disposed in order from an object side, and an aperture stop disposed at an object side of the third lens group. When changing the magnification from a wide angle end to a telephoto end, an interval between the first and second lens groups increases, an interval between the second and third lens groups decreases, and an interval between the third and fourth lens groups changes.

9 Claims, 21 Drawing Sheets

U.S. PATENT DOCUMENTS

| | | |
|---|---|---|
| 7,298,537 B2 | 11/2007 | Hayashi et al. |
| 7,397,591 B2 | 7/2008 | Hayashi et al. |
| 7,450,316 B2 | 11/2008 | Morooka |
| 7,525,710 B2 | 4/2009 | Atsuumi et al. |
| 7,663,808 B2 | 2/2010 | Ohashi |
| 7,933,074 B2 | 4/2011 | Takano et al. |
| 8,054,559 B2 * | 11/2011 | Takano et al. .................. 359/687 |
| 2002/0089762 A1 | 7/2002 | Hoshi |
| 2006/0238845 A1 | 10/2006 | Atsuumi et al. |
| 2007/0206261 A1 | 9/2007 | Hayashi et al. |
| 2007/0216316 A1 | 9/2007 | Hirano et al. |
| 2009/0059335 A1 | 3/2009 | Amada et al. |
| 2009/0086333 A1 * | 4/2009 | Take ............................ 359/676 |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2011/0002048 A1 | 1/2011 | Takano et al. |

FOREIGN PATENT DOCUMENTS

| | | |
|---|---|---|
| JP | 2005-326743 | 11/2005 |
| JP | 2008-26837 | 2/2008 |
| JP | 2008-76493 | 4/2008 |
| JP | 2008-96924 | 4/2008 |
| JP | 2008-107559 | 5/2008 |
| JP | 2008-112013 | 5/2008 |

* cited by examiner

Wide

Tele

Wide

Tele

FIG.9A Wide
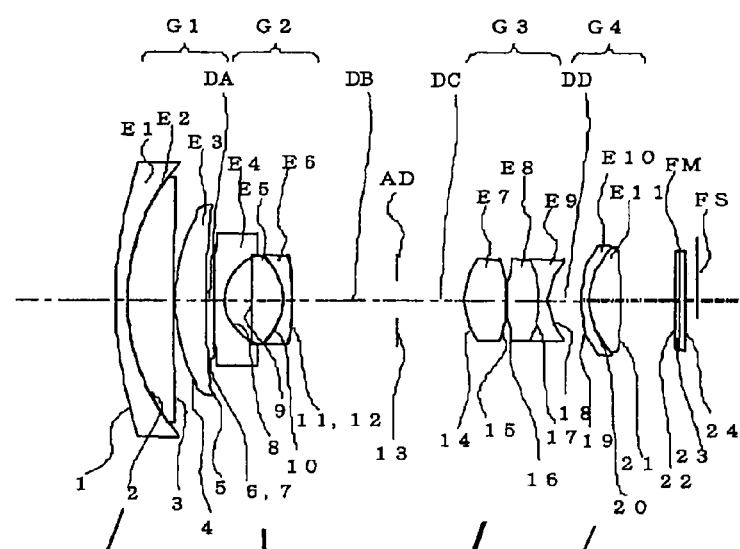
FIG.9B
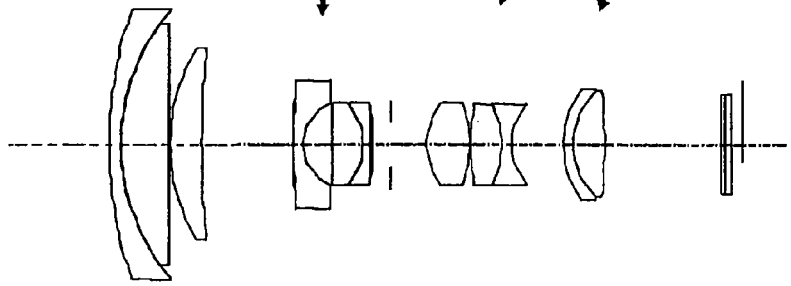
FIG.9C Tele
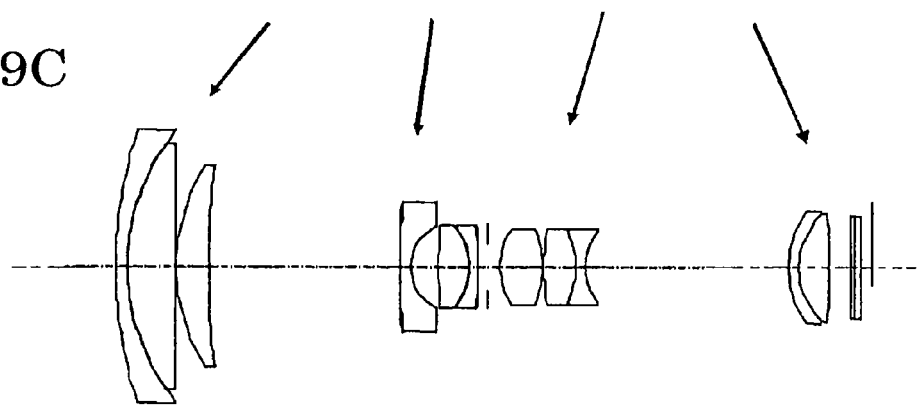

Wide

Tele

Wide

Tele

Wide

Tele

Wide

Tele

ZOOM LENS, INFORMATION DEVICE, AND IMAGING APPARATUS

CROSS REFERENCE TO RELATED APPLICATIONS

The present application is a divisional of U.S. application Ser. No. 12/726,866, filed Mar. 18, 2010, now U.S. Pat. No. 8,054,559, and is based on and claims priority from Japanese Application Number 2009-065954, filed on Mar. 18, 2009, the contents of each of which are incorporated herein in their entirety.

BACKGROUND OF THE INVENTION

1. Field of the Invention

The present invention relates to a zoom lens preferably used in a digital camera configured to obtain subject image data via an image pickup device such as a solid-state image pickup device, more particularly, to a zoom lens preferably used as an imaging optical system in a video camera for obtaining a moving image as well as a still image camera for obtaining a still image and also in a silver salt camera using a silver salt film as an image recording medium, and also to an information device having the zoom lens, an imaging apparatus having the zoom lens as an imaging optical system, and the like.

2. Description of the Related Art

Recently, instead of a still camera in a film type using a silver salt film as an image recording medium, that is, a silver-salt camera, an imaging apparatus such as a digital camera obtaining a still camera, a video or a moving image of a subject via a solid-state image pickup device such as a CCD (charge-coupled device) image pickup device, a CMOS (complementary metal-oxide semiconductor) image pickup device, and the like and an information device having such a camera function, for example, a personal digital assistant, have been widely used. User requirements in the above devices have been diversified and particularly, of the user requirements, an imaging apparatus having a small size and high variable power ratio at a wide field angle has been required.

In order to downsize a zoom lens used as an imaging optical system in such an imaging apparatus, it is required to reduce an entire length of lenses when changing magnification of the zoom lens (that is, a distance from a lens surface at the most object side to an image plane), more particularly, to reduce an entire length of the lenses at a telephoto end. Furthermore, in order to downsize the imaging apparatus, it is important to suppress the entire length of the lenses at a collapsed state by reducing a thickness of each lens group. In order to achieve high performance of the zoom lens, considering possibility of application to the high-end digital camera, resolution corresponding to an image pickup device having at least more than 5 to 10 million pixels is required over an entire zoom range.

In order to achieve a wide filed angle of the imaging optical system, it is preferable to achieve a half field angle of 38 degree or more at a wide angle end. The half field angle of 38 degrees corresponds to a focal length of 28 mm in a case of a silver-salt camera using a silver-salt film (so-called Leica film) having a width of 35 mm.

In order to achieve a high variable power ratio, a zoom lens having an ability of changing a magnification from a focal length of 28 mm to 300 mm, that is, about ten times of the variable power ratio is sufficient for a general photographing.

Although there are various types of the zoom lens for a digital camera, the zoom lens having five or more lens groups is not suitable for a small size camera because it is difficult to reduce a total thickness of the lens groups.

As the zoom lens having four lens groups suitable for a high variable power ratio and large aperture, an example of a zoom lens including a first lens group having a positive refracting power, a second lens group having a negative refracting power, an aperture stop, a third lens group having a positive refracting power, and a fourth lens group having a positive refracting power, which are disposed in order from an object side, when changing the magnification of the zoom lens from a wide angle end to a telephoto end, an interval between the first and second lens groups is increased, an interval between the second and third lens groups is decreased, an interval between the third and fourth lens groups is changed, and the second lens group has a negative lens, a positive lens, and a negative lens, in order from the object side is disclosed in Japanese Patent Application Publication Nos. 2004-199000, 2005-326743, 2008-76493, 2008-96924, 2008-26837, 2008-112013, and 2008-107559.

The zoom lens disclosed in Japanese Patent Application Publication Nos. 2004-199000, 2005-326743, 2008-76493, and 2008-96924 has a variable power ratio of about 2.8 to 6.8 times and therefore it is not sufficient for satisfying the user's requirements.

The zoom lens disclosed in Japanese Patent Application Publication No. 2008-26837 has a variable power ratio of about 10 times but has a large telephoto ratio and therefore is not preferable for providing a compact size.

The zoom lens disclosed in Japanese Patent Application Publication No. 2008-112013 has a remarkably large variable power ratio, that is, about 9.5 times and a field angle of about 40 degrees at the wide angle end as well as a relatively small telephoto ratio. In this point, user requirements are satisfied, but lens performance, aberration such as color aberration can be further improved. That is, referring to the specific configurations shown in Japanese Patent Application Publication No. 2008-112013, as described above, a wide half field angle and a sufficient variable power ratio can be obtained at the wide angle end. However, at the telephoto end, distortion is large, that is, 10% or more and therefore, even when the distortion is corrected, the corrected amount is large so that an image is degraded.

The zoom lens disclosed in Japanese Patent Application Publication No. 2008-107559 has, in a specific configuration example, a wide half field angle, that is, about 40 degrees at the wide angle end, but the variable power ratio is about 5 times. In addition, the distortion is about 10% at the wide angle end and therefore even when the distortion is corrected, the corrected amount is large so that the image is degraded.

As described above, the zoom lens disclosed in the above-described prior arts does not sufficiently satisfy the user requirements, that is, high variable power ratio, wide field angle and small size are achieved while the aberration is reduced. It is required to provide a zoom lens having high variable power ratio, wide field angle, and small size as well as reduced aberration.

SUMMARY OF THE INVENTION

An object of the present invention is to provide a zoom lens, an information device, and an imaging apparatus capable of sufficiently correcting aberrations with a sufficiently-wide field angle, that is, half field angle of 38 degrees or more at the wide angle end and with a highly-variable power ratio of 10 times or more as well as high resolution sufficient for using a small size and high resolution image pickup device having more than 5 to 10 million pixels.

To achieve the above object, a zoom lens according to an embodiment of the present invention includes a first lens group having a positive refracting power, a second lens group having a negative refracting power, a third lens group having a positive refracting power, and a fourth lens group having a positive refracting power, which are disposed in order from an object side to an image side, and an aperture stop disposed at an object side of the third lens group, the second lens group including a negative lens, a positive lens, and a negative lens, which are disposed in order from the object side. When changing the magnification of the zoom lens from a wide angle end to a telephoto end, an interval between the first and second lens groups increases, an interval between the second and third lens groups decreases, and an interval between the third and fourth lens groups changes. The following conditions (1) and (2) are satisfied:

$$0.50 < fl/ft < 0.80; \quad (1)$$

$$vd1ave > 47, \quad (2)$$

where fl is a focal length of the first lens group, ft is a focal length of the zoom lens at the telephoto end, and vd1ave is an average Abbe number of the first lens group.

BRIEF DESCRIPTION OF THE DRAWINGS

FIG. 9A is a schematic sectional view of a zoom lens according to an example 3, 7 or 13 at a wide angle end.

FIG. 9B is a schematic sectional view of the zoom lens according to the example 3, 7 or 13 at a predetermined intermediate focal length position.

FIG. 9C is a schematic sectional view of the zoom lens according to the example 3, 7 or 13 at a telephoto end.

DETAILED DESCRIPTION OF THE PREFERRED EMBODIMENTS

Figure 1A:
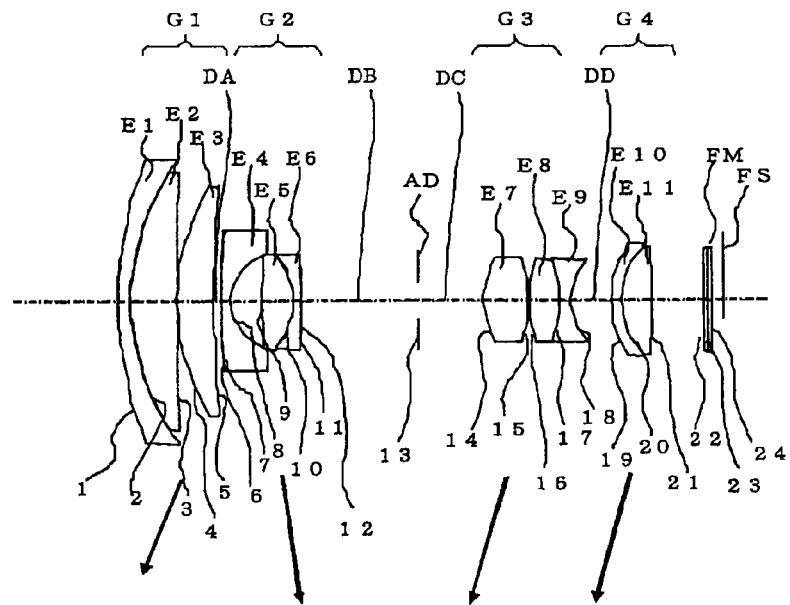
FIG. 1A is a schematic sectional view of a zoom lens according to an example 1 or 11 at a wide angle end.

Preferred embodiments of a zoom lens, an information device, and an imaging apparatus according to the present invention will be explained in detail hereinafter with reference to the accompanying drawings. At first, fundamental embodiments of the present invention will be explained.

A zoom lens according to a first embodiment of the present invention includes a first lens group having a positive refracting power, a second lens group having a negative refracting power, a third lens group having a positive refracting power, and a fourth lens group having a positive refracting power, which are disposed in order from an object side to an image side (also referred to as an image plane side), and an aperture stop disposed at an object side of the third lens group. The second lens group may include a negative lens, a positive lens, and a negative lens, which are disposed in order from the object side. When changing the magnification of the zoom lens from a wide angle end to a telephoto end, an interval between the first and second lens groups increases, an interval between the second and third lens groups decreases, and an interval between the third and fourth lens groups changes.

The following conditions (1) and (2) are preferably satisfied:

$$0.50 < fl/ft < 0.80; \tag{1}$$

$$vd1ave > 47, \tag{2}$$

where fl is a focal length of the first lens group, ft is a focal length of the zoom lens at the telephoto end, and vd1ave is an average Abbe number of the first lens group.

The condition (1) is a condition for achieving an aberration correction by controlling a focal length of the first lens group, which is important for a wide angle, telephoto, and a small-size zoom lens.

If the value of (fl/ft) is 0.80 or more, an extension amount of the first lens group at the telephoto end is required to be increased in order to obtain a large variable power ratio so that it is difficult to achieve the small size zoom lens. If the value of (fl/ft) is 0.5 or less, each type of aberrations is increased with increase of refracting power so that it is difficult to sufficiently correct the aberration. If the condition (1) is satisfied, the small size zoom lens can be achieved with the large variable power ratio while the aberration is sufficiently corrected.

More preferably, the following stricter condition, having a narrower range is satisfied:

$$0.52 < fl/ft < 0.72 \tag{1A}$$

With respect to the condition (2), if the average Abbe number of the first lens group is 47 or less, occurrence of chromatic aberration is increased so that it is difficult to correct the aberration. That is, if the condition (2) is satisfied, the zoom lens capable of well correcting chromatic aberration can be achieved.

In order to achieve a zoom lens which suppresses each type of aberrations from the wide angle end to the telephoto end while achieving high resolution, it is necessary to suppress variations of the aberrations when changing of the magnification of the zoom lens and specifically, it is necessary to successfully correct the aberration of the second lens group which is used for changing the magnification, over an entire range of the variable magnification. Therefore, as described above, the configuration of the second lens group is important. A second positive lens from the object side and a third negative lens may be cemented with each other.

In the above described zoom lens, it is preferable that the following condition (3) is satisfied:

$$1.0 < Tpr < 1.5, \tag{3}$$

where Tpr is a telephoto ratio which is obtained by dividing an entire length at the telephoto end by the focal length of the zoom lens at the telephoto end, that is, Tpr=(the entire length at the telephoto end)/(the focal length of the zoom lens at the telephoto end).

The condition (3) is a condition for sufficiently correct the aberration by controlling the extension amount of the first lens group, which is important for a wide angle, telephoto, and a small-size zoom lens.

If the telephoto ratio Tpr is 1.5 or more, the extension amount of the first lens group is increased so that it is difficult to achieve a small size zoom lens and also the size in a radial direction is increased in order to ensure peripheral light amount at the telephoto end or degrade in image performance due to preparation errors such as tilting of the lens barrel or the like easily occurs. If the telephoto ratio Tpr is 1.0 or less, the movement amount of the first lens group is decreased and the contribution of the first lens group to the magnification of the second lens group is decreased. Accordingly, it is necessary to increase the burden of the third lens group or to increase the refracting power of the second lens group and therefore, in both cases, each aberration is increased.

The following condition is preferably satisfied:

$$1.0 < Tpr < 1.3. \tag{3A}$$

In order to offer technical advantages or higher performance in such a zoom lens, it is preferable that at least one negative lens of the second lens group is formed as a hybrid aspheric lens. Here, the hybrid aspheric lens is formed by forming a thin film made of a resin on a spherical lens of a glass to make the surface aspheric and by integrating the spherical surface of the glass and the aspheric surface of the thin film so that the lens functions totally as an aspheric lens. By using such a hybrid aspheric lens, it is achieved not only to offer the technical advantages or the higher performance as described above, but also to freely select a glass material and to achieve low cost zoom lens. Furthermore, in order to offer the high performance, it is preferable that both of two negative lenses of the second lens group are hybrid aspheric lenses.

Furthermore, in order to achieve higher performance of the zoom lens, it is preferable that the first lens group includes one negative lens and two positive lenses and has an aspheric surface at the most image side.

In order to achieve higher performance, it is preferable that the third lens group includes one negative lens and two positive lenses and one lens disposed at the most object side has an aspheric surface.

Furthermore, it is preferable that the most object side lens of the third lens group has two aspheric surfaces opposite to each other. According to the configuration, each aberration can be corrected so that higher performance can be achieved.

In order to achieve higher performance, it is preferable that the fourth lens group includes at least one positive lens and at least one negative lens, and has an aspheric surface at the most object side. By disposing the aspheric lens at the most object side of the fourth lens group, since light fluxes are away from the optical axis, large effects due to the aspheric surface can be obtained in the correction of the image plane.

In the above zoom lens, it is preferable that the following condition (8) is satisfied:

$$ft/fw>7, \qquad (8)$$

where ft is a focal length of the zoom lens at the telephoto end, and fw is a focal length of the zoom lens at the wide angle end.

Here, the condition (8) is for controlling a zoom ratio, and it can be achieved high variable ratio such as 7 times or more as well as high performance and compact zoom lens. It is further preferable that the following condition (8A) is satisfied:

$$ft/fw>10. \qquad (8A)$$

Furthermore, it is preferable that the following condition (9) is satisfied:

$$0.78 \leq Y'/fw, \qquad (9)$$

where Y' is a maximum image height, fw is a focal length of the zoom lens at the wide angle end.

Here, the condition (9) is for controlling a field angle, and it is possible to provide a high-performance and compact zoom lens with a high variable power ratio and a half field angle of 38 degrees or more at the wide angle end.

In the above described zoom lens, it is preferable that, when changing the magnification of the zoom lens from the wide angle end to the telephoto end, the first and third lens groups are moved toward the object side, the second lens group is moved toward the image side, and the fourth lens group is moved on a trajectory in a curve convex toward the object side. Such a configuration, it is possible to effectively reduce the movement amount of the first lens group and the aberration can be advantageously corrected.

When focusing on a finite distance, it is preferable that only the fourth lens group is moved so that only minimum weight of an object to be moved is required.

It is preferable that an aperture diameter of the aperture stop is constant independently from the variable magnification to simplify the mechanism. However, if the aperture diameter at the telephoto end is set to be larger than the aperture diameter at the wide angle end, variation of an F number can be reduced. When it is necessary to reduce amount of light fluxes reaching the image plane, the aperture diameter of the aperture stop may be narrowed. On the other hand, it is more preferable that the light amount may be reduced by inserting an ND filter, or the like without changing the aperture diameter, because degrade of resolution due to diffraction phenomenon can be prevented.

An information device according to an embodiment of the present invention has an imaging function by use of the zoom lens according to the above-described first embodiment as an imaging optical system. Such an information device may be configured such that an object image through the zoom lens is imaged on a light-receiving surface of an image pickup device. As described above, the information device is implemented as a digital camera, a video camera, a silver salt camera, and the like and is preferably configured as a personal digital assistant.

According to the above described configurations of the zoom lens of the first embodiment of the present invention, it is possible to provide a zoom lens capable of sufficiently correcting aberrations with a sufficiently-wide field angle, that is, half field angle of 38 degrees or more at the wide angle end and with a variable power ratio of 10 times or more. And then, the zoom lens having resolution sufficient for using a small size and high resolution image pickup device can be provided. By using such a zoom lens as an imaging optical system, a small size and high-performance imaging function can be achieved.

A zoom lens according to a second embodiment of the present invention includes a first lens group having a positive refracting power, a second lens group having a negative refracting power, a third lens group having a positive refracting power, and a fourth lens group having a positive refracting power, which are disposed in order from an object side to an image side, and an aperture stop disposed at an object side of the third lens group. The second lens group may include a negative lens, a positive lens, and a negative lens, which are disposed in order from the object side. When changing the magnification of the zoom lens from a wide angle end to a telephoto end, an interval between the first and second lens groups increases, an interval between the second and third lens groups decreases, and an interval between the third and fourth lens groups changes. The following condition (4) is satisfied:

$$1.6<(\beta 2t/\beta 2w)/(\beta 3t/\beta 3w)<3.5, \qquad (4)$$

where β2w is a lateral magnification of the second lens group at the wide angle end, β2t is a lateral magnification of the second lens group at the telephoto end, β3w is a lateral magnification of the third lens group at the wide angle end, and β3t is a lateral magnification of the third lens group at the telephoto end.

The condition (4) defines an appropriate ratio of variable power ratios of the second lens group and the third lens group. If the value of (β2t/β2w)/(β3t/β3w) in the condition (4) is the upper limit value or more, burden of the variable power ratio of the second lens group is increased and variation of the interval between the second lens group and the first and/or third lens group is increased.

In order to suppress the variation of the interval, although it is necessary to increase the power (refracting power) of the second lens group, the aberrations not-preferably occur with the increase of the power because it is difficult to correct the aberration.

If the value of the condition (4) is the lower limit value or less, the burden of the variable power ratio of the third lens group is increased and variation of the interval between the third lens group and the second and/or fourth lens group is increased.

In order to suppress the variation of the interval, although it is necessary to increase the power of the third lens group, the aberrations not-preferably occur with the increase of the power because it is difficult to correct the aberration. If the power of each lens groups is increased, eccentric error sensitivity is increased. Accordingly, eccentric tolerance is strict and adjustments for suppressing the variation are required so that the cost is not-preferably increased.

It is further preferably that the following condition (4A) is satisfied:

$$1.6<(\beta 2t/\beta 2w)/(\beta 3t/\beta 3w)<3.2. \qquad (4A)$$

In the above described zoom lens, it is preferable that the following conditions (5) and (6) are satisfied:

$$4.0<\beta 2t/\beta 2w<5.5; \qquad (5)$$

$$1.5<\beta 3t/\beta 3w<3.5. \qquad (6)$$

The condition (5) defines an appropriate range of variable power ratio of the second lens group. If the value $\beta 2t/\beta 2w$ of the condition (5) exceeds the upper limit value, the burden of the variable power ratio of the second lens group is increased so that the variation of the interval between the second lens group and the first and/or third lens group is increased. In order to suppress the variation of the interval, it is necessary to increase the power of the second lens group, but the increase of the power causes occurrence of aberration so that it is difficult to correct the aberration. Accordingly, it is not preferable to increase the power of the second lens group.

Then, the condition (6) defines a range of an appropriate variable power ratio of the third lens group. If the value $\beta 3t/\beta 3w$ of the condition (6) exceeds the upper limit value, the burden of the variable power ratio of the third lens group is increased so that the variation of the interval between the third lens group and the second and/or fourth lens group is increased. In order to suppress the variation of the interval, it is necessary to increase the power of the third lens group, but the increase of the power causes occurrence of aberration so that it is difficult to correct the aberration. Accordingly, it is not preferable to increase the power of the second lens group. Furthermore, if the power of each lens group is increased, eccentric error sensitivity is also increased so that eccentric tolerance is strict and adjustments for suppressing the variation are required so that the cost is not-preferably increased.

In the above described zoom lens, it is preferable that the following condition (7) is satisfied:

$$1.0<Tpr<1.5, \qquad (7)$$

where Tpr is a telephoto ratio obtained by dividing an entire length at the telephoto end by the focal length of the zoom lens at the telephoto end, that is, Tpr=(the entire length at the telephoto end)/(the focal length of the zoom lens at the telephoto end).

The condition (7) is a condition for sufficiently correct the aberration by controlling the extension amount of the first lens group, which is important for a wide angle, telephoto, and a small-size zoom lens.

If the telephoto ratio Tpr is 1.5 or more, the extension amount of the first lens group is increased so that it is difficult to achieve a small size zoom lens and also the size in a radial direction is increased in order to ensure peripheral light amount at the telephoto end or degrade in image performance due to preparation errors such as tilting of the lens barrel or the like easily occurs. If the telephoto ratio Tpr is 1.0 or less, the movement amount of the first lens group is decreased and the contribution of the first lens group to the magnification of the second lens group is decreased. Accordingly, it is necessary to increase the burden of the third lens group or to increase the refracting power of the second lens group and therefore, in both cases, each aberration is increased.

The following condition is preferably satisfied:

$$1.0<Tpr<1.3. \qquad (7A)$$

In order to offer technical advantages or higher performance in such a zoom lens, it is preferable that at least one negative lens of the second lens group is formed as a hybrid aspheric lens. Here, the hybrid aspheric lens is formed by forming a thin film made of a resin on a spherical lens of a glass to make the surface aspheric and by integrating the spherical surface of the glass and the aspheric surface of the thin film so that the lens functions totally as an aspheric lens. By using such a hybrid aspheric lens, it is achieved not only to offer the technical advantages or the higher performance as described above, but also to freely select a glass material and to achieve low cost zoom lens. Furthermore, in order to offer the high performance, it is preferable that both of two negative lenses of the second lens group are hybrid aspheric lenses.

Furthermore, in order to achieve higher performance of the zoom lens, it is preferable that the first lens group includes one negative lens and two positive lenses and has an aspheric surface at the most image side.

In order to achieve higher performance, it is preferable that the third lens group includes one negative lens and two positive lenses and one lens disposed at the most object side has an aspheric surface. According to the configuration, each aberration can be corrected so that higher performance can be achieved.

In order to achieve higher performance, it is preferable that the fourth lens group includes at least one positive lens, and has an aspheric surface at the most object side.

By disposing the aspheric surface at the most object side of the fourth lens group, since light fluxes are away from the optical axis, large effects due to the aspheric surface can be obtained in the correction of the image plane.

In the above zoom lens, it is preferable that the following condition (8) is satisfied:

$$ft/fw>7, \qquad (8)$$

where ft is a focal length of the zoom lens at the telephoto end, and fw is a focal length of the zoom lens at the wide angle end.

Here, the condition (8) is for controlling a zoom ratio, and it can be achieved high variable ratio such as 7 times or more as well as high performance and compact zoom lens. It is further preferable that the following condition (8A) is satisfied:

$$ft/fw>10. \qquad (8A)$$

Furthermore, in the above described zoom lens, it is preferable that the following condition (9) is satisfied:

$$0.78 \leq Y'/fw, \qquad (9)$$

where Y' is a maximum image height, fw is a focal length of the zoom lens at the wide angle end.

Here, the condition (9) is for controlling a field angle, and it is possible to provide a high-performance and compact zoom lens with a high variable power ratio and a half field angle of 38 degrees or more at the wide angle end.

In the above described zoom lens, it is preferable that, when changing the magnification of the zoom lens from the wide angle end to the telephoto end, the first and third lens groups are moved toward the object side, the second lens group is moved toward the image side, and the fourth lens group is moved on a trajectory in a curve convex toward the object side. Such a configuration, it is possible to effectively reduce the movement amount of the first lens group and the aberration can be advantageously corrected.

When focusing on a finite distance, it is preferable that only the fourth lens group is moved so that only minimum weight of an object to be moved is required.

It is preferable that an aperture diameter of the aperture stop is constant independently from the variable magnification to simplify the mechanism. However, if the aperture diameter at the telephoto end is set to be larger than the aperture diameter at the wide angle end, variation of an F number can be reduced. When it is necessary to reduce amount of light fluxes reaching the image plane, the aperture diameter of the aperture stop may be narrowed. On the other hand, it is more preferable that the light amount may be reduced by inserting an ND filter, or the like without changing the aperture diameter, because degrade of resolution due to diffraction phenomenon can be prevented.

An information device according to an embodiment of the present invention has an imaging function by use of the zoom lens according to the above-described second embodiment as an imaging optical system. Such an information device may be configured such that an object image through the zoom lens is imaged on a light-receiving surface of an image pickup device. As described above, the information device is implemented as a digital camera, a video camera, a silver salt camera, and the like and is preferably configured as a personal digital assistant.

According to the above described configurations of the zoom lens of the second embodiment of the present invention, it is possible to provide a zoom lens capable of sufficiently correcting aberrations with a sufficiently-wide field angle, that is, half field angle of 38 degrees or more at the wide angle end and with a variable power ratio of 10 times or more. And then, the zoom lens having resolution sufficient for using a small size and high resolution image pickup device can be provided. By using such a zoom lens as an imaging optical system, a small size and high-performance imaging function can be achieved.

A zoom lens according to a third embodiment of the present invention includes a first lens group having a positive refracting power, a second lens group having a negative refracting power, a third lens group having a positive refracting power, and a fourth lens group having a positive refracting power, which are disposed in order from an object side to an image side, and an aperture stop disposed between the second and third lens groups. When changing the magnification of the zoom lens from a wide angle end to a telephoto end, an interval between the first and second lens groups increases, an interval between the second and third lens groups decreases, and an interval between the third and fourth lens groups increases. The first lens group includes a negative lens, a positive lens, and a positive lens, which are disposed in order form the object side. The second lens group includes a negative lens, a positive lens, and a negative lens, which are disposed in order from the object side. The fourth lens group includes at least one positive lens and at least one negative lens. The following condition (10) is satisfied:

$$5 < fl/fw < 8, \quad (10)$$

where fl is a focal length of the first lens group and fw is a focal length of the zoom lens at the wide angle end.

The condition (10) is a range of a ratio of the focal length of the first lens group to the focal length of whole optical system of the zoom lens at the wide angle end. If the ratio of the focal lengths is the upper limit value 8 or more, the size of the zoom lens in a collapsed state is increased so that it is difficult to provide a compact zoom lens. If the ratio of the focal lengths is the lower limit value 5 or less, it is difficult to sufficiently correct each aberration.

Based on such a configuration, it is preferable that the most image side positive lens of the first lens group has an aspheric surface. By having the aspheric lens as the most image side lens of the first lens group, good aberration correction can be achieved. This configuration is effective particularly for the correction of distortion.

Based on the above described zoom lens, it is preferable that the following conditions (11) to (13) are satisfied:

$$0.2 < ((D1+D2) \times fw)/(Y'\max \times ft) < 0.5; \quad (11)$$

$$0.9 < Tpr < 1.5; \quad (12)$$

$$1 < (L\max \times fw)/(Y'\max \times ft) < 2, \quad (13)$$

where fw is a focal length of the zoom lens at the wide angle end, ft is a focal length of the zoom lens at the telephoto end, D1 is a thickness of the first lens group on an optical axis, D2 is a thickness of the second lens group on the optical axis, Y'max is a maximum image height, Tpr is a telephoto ratio at the telephoto end, that is, (the entire length at the telephoto end)÷(the focal length of the zoom lens at the telephoto end), and Lmax is a maximum value of a distance from the most object side surface to an image plane within an entire focal range.

The condition (11) is a range of a value obtained by dividing a sum of the thickness of the first lens group and the thickness of the second lens group on the optical axis by a variable power ratio to the maximum image height.

If the value of the condition (11) is the upper limit value 0.5 or more, the size of the zoom lens in a collapsed state is increased so that it is difficult to provide a compact zoom lens. If the value of the condition (11) is the lower limit value 0.2 or less, it is difficult to sufficiently correct each aberration.

The condition (12) is a range of the telephoto ratio at the telephoto end, and shows that the telephoto ratio is suitable for an optical system having the telephoto ratio of more than 0.9 and less than 1.5. The condition (13) is a relationship between the maximum distance Lmax from the most object side surface to the image plane and the variable power ratio and the maximum image height. If the value of the condition (13) is the upper limit value or more, the size of the zoom lens in the collapsed state is increased so that it is difficult to provide a compact camera. If the value of the condition (13) is the lower limit value 1.0 or less, it is difficult to sufficiently correct each aberration.

Based on the above configuration of the zoom lens, it is further preferable that the following condition (14) is satisfied:

$$6 < L3\max/Y'\max < 8, \quad (10)$$

where L3max is a maximum distance from the most object side surface of the third lens group to an image plane within an entire focal range, and Y'max is a maximum image height.

The condition (14) is a ratio of the maximum distance L3max from the most object side surface of the third lens group to the image plane within the entire focal range to the image height Y'max.

If the ratio is the upper limit value 8 or more, a length of a lead screw for extending the third lens group is increased and therefore the size of the zoom lens in the collapsed state is increased so that it is difficult to provide a compact camera. If the ratio is the lower limit value 6 or less, the third lens group cannot have a sufficient variable power function and therefore it is difficult to provide a good balance of functions for correcting aberrations of each lens group so that it is difficult to sufficiently correct each aberration. Accordingly, by satisfying the condition (14), it is possible to provide a compact zoom lens in the collapsed state and to achieve good correction of the aberrations.

Based on the above configurations of the zoom lens, it is further preferable that the following condition (15) is satisfied:

$$ft/fw > 7, \quad (15)$$

where ft is a focal length of the zoom lens at the telephoto end, and fw is a focal length of the zoom lens at the wide angle end.

The condition (15) is a variable power ratio, that is, the variable power ratio is suitably 7 or more.

An imaging apparatus according to an embodiment of the present invention may use the zoom lens according to the third embodiment as an optical system and may be configured such that at least one of the third and fourth lens groups is configured to be retracted from the optical axis of the zoom lens in a collapsed state.

That is, although in the above third embodiment of the present invention, the condition for achieving the compact zoom lens and good aberration correction is shown, by allowing at least one of the third and fourth lens groups to be retracted from the optical axis in the collapsed state, it is possible to provide improved compact zoom lens.

In addition, as described above, in the zoom lens including the first lens group having the positive refracting power, the second lens group having the negative refracting power, the third lens group having the positive refracting power, and the fourth lens group having the positive refracting power in order from the object side to the image plane side, that is, in the zoom lens having four positive-negative-positive-positive lens groups, the second lens group serves as a variator for performing a changing operation of magnification. However, in the above-described zoom lens, the third lens group also serves as the variator and therefore the burden of the second lens group is reduced. Accordingly, flexibility of correction can be ensured even in the wide angle and high variable power zoom lens, where it is normally difficult to sufficiently correct aberrations.

By moving the first lens group toward the object side while changing the magnification from the wide angle end to the telephoto end, height of light fluxes passing through the first lens group at the wide angle end is reduced in order to suppress increase of the size of the first lens group in the wide angle zoom lens and an interval between the first and second lens groups is sufficiently ensured to suppress increase of an F value (number) at a long focus side.

Accordingly, the above described zoom lens can be capable of sufficiently correcting the aberration and having a small size, and used for an image pickup device having more than 5 to 10 million pixels. By using such a zoom lens, small size and high performance digital camera, or the like can be achieved.

Example 1

Next, specific examples of the above embodiments of the present invention will be explained in detail. The following examples 1 to 3 and 4 are the specific numerical examples of the zoom lens having the configuration of the first embodiment of the present invention. The following examples 5, 6, 7, 8, 9, and 10 are the specific numerical examples of the zoom lens having the configuration of the second embodiment of the present invention. The following examples 11, 12, 13, and 14 are the specific numerical examples of the zoom lens having the configuration of the third embodiment of the present invention.

In the examples 1 to 14, a parallel plate optical element disposed at an image plane side of the fourth lens group is, for example, an optical filter such as an optical low-pass filter, an infrared cut filter, or the like, a cover glass (seal glass) of an image pickup device such as a CCD sensor, or the like, and is referred to as a filter FM.

In the examples 1 to 14, each of an object side surface of a most image plane side lens of the first lens group, a most object side surface and a most image plane side surface of the second lens group, object side and image plane side surfaces of a most object side lens of the third lens group, and a most object side surface of the fourth lens group is an aspheric surface. In order to form an aspheric surface, as a so-called mold aspheric lens, each lens surface may be directly formed to be an aspheric surface or, as a so-called hybrid aspheric lens, a spherical lens surface may be covered with a resin thin film to form an aspheric surface.

Aberrations in the examples 1 to 14 are sufficiently corrected and the zoom lens can be used for a light-receiving element having 8 to 10 million pixels or more. By use of the configuration of the zoom lens according to an embodiment of the present invention, it is clearly found that it is possible to provide a zoom lens having a sufficiently-small size and good image performance according to the examples 1 to 14.

The following reference numbers are commonly used in the examples 1 to 14.

f: focal length of whole system of the zoom lens
F: F number
ω: half field angle
R: curvature radius (or paraxial curvature radius for aspheric surface)
D: surface interval
$N_d$: refracting index
$v_d$: Abbe number
K: conic constant of aspheric surface
$A_4$: fourth order aspheric coefficient
$A_6$: sixth order aspheric coefficient
$A_8$: eighth order aspheric coefficient
$A_{10}$: tenth order aspheric coefficient
$A_{12}$: twelfth order aspheric coefficient
$A_{14}$: fourteenth order aspheric coefficient An aspheric form used in the following examples is defined in the following equation (16) and obtains a paraxial curvature radius, a conic constant, and each order aspheric coefficient to specify the form:

$$X = \frac{CH^2}{1 + \sqrt{1 - (1+K)C^2H^2}} + A_4 \cdot H^4 + A_6 \cdot H^6 + A_8 \cdot H^8 + A_{10} \cdot H^{10} + A_{12} \cdot H^{12} + A_{14} \cdot H^{14}H \quad (16)$$

where X is an aspheric amount in a direction of the optical axis, C is an inverse of a paraxial curvature radius (paraxial curvature), H is a height from an optical axis of the zoom lens, and K is a conic constant.

At first, in each of the examples 1 to 4 of the zoom lens according to the first embodiment of the present invention, a configuration and specific numerical examples are shown.

Figure 1B:
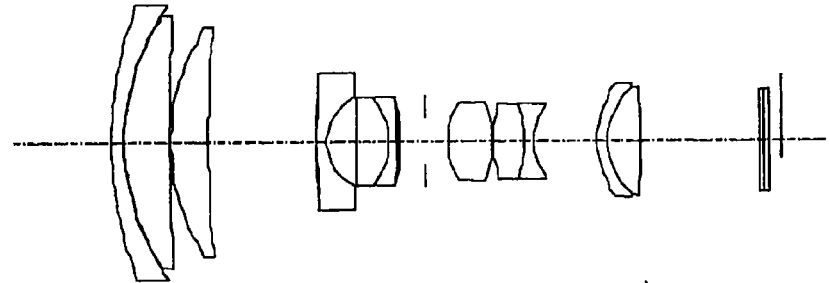
FIG. 1B is a schematic sectional view of the zoom lens according to the example 1 or 11 at a predetermined intermediate focal length position.
Figure 1C:
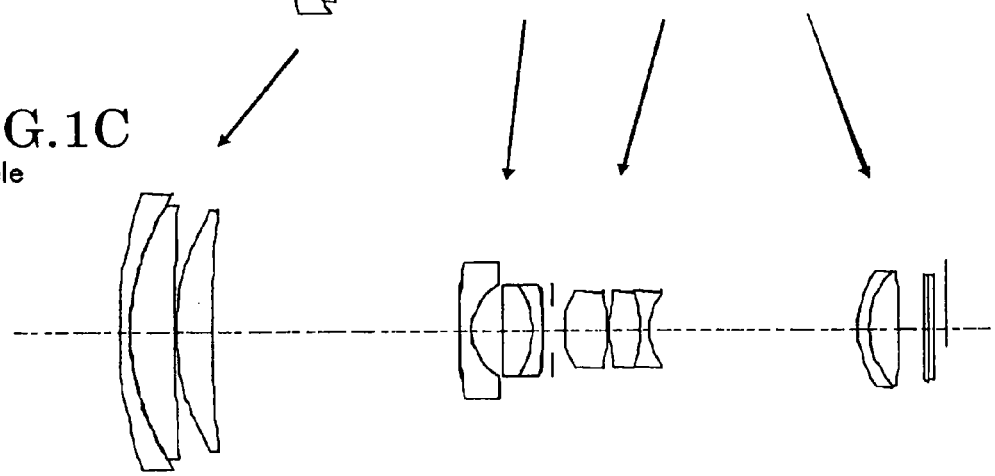
FIG. 1C is a schematic sectional view of the zoom lens according to the example 1 or 11 at a telephoto end.

FIG. 1A to 1C are schematic views of lens configurations of the zoom lens according to the example 1 of the first embodiment of the present invention on a zooming trajectory when zooming from a wide angle end to a telephoto end via a predetermined intermediate focal length position, that is, FIG. 1A is a schematic sectional view of the zoom lens at the wide angle end, FIG. 1B is a schematic sectional view of the zoom lens at the predetermined intermediate focal length position, and FIG. 1C is a schematic sectional view of the zoom lens at the telephoto end. A left side of FIGS. 1A to 1C is an object side of the zoom lens.

The zoom lens shown in FIG. 1A to 1C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group. FIGS. 1A to 1C show reference numbers of each surface. In addition, the same reference numbers are independently used in each example for sake of simplicity and therefore the configuration indicated by the same reference number is not always the same configuration.

When changing the magnification of the zoom lens from the wide angle end (short focal end) to the telephoto end (long focal end), all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens and an aspheric surface at the image plane side in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens (a so-called hybrid lens) having an aspheric surface formed by applying a resin layer at the object side, the fifth lens E5 provided with a double-convex positive lens, and the sixth lens E6 provided with an aspheric lens having an aspheric surface formed by applying a resin layer to an image plane side surface of a negative meniscus lens having a convex surface directed toward the image plane side, in order from the object side. The fifth and sixth lenses E5, E6 are closely stuck and cemented together with each other to form a cemented lens formed by the two lenses.

The third lens group G3 includes the seventh lens E7 provided with a double-convex and -aspheric positive lens having a stronger convex surface at the object side, the eighth lens E8 provided with a double-convex positive lens having a stronger convex surface at the image plane side, and the ninth lens E9 provided with a double-concave negative lens having a stronger concave surface at the image plane side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having an aspheric surface at the object side and a convex surface directed toward the object side, and the eleventh lens E11 provided with a double convex positive lens having a stronger convex surface directed toward the object side than that at the image plane side, in order from the object side. The tenth and eleventh lenses E10, E11 are closely stuck and cemented together with each other to form a cemented lens formed by the two lenses.

In this case, as shown in FIGS. 1A to 1C, the first and third lens groups G1 and G3 are moved from the image plane side to the object side, and the second lens group G2 is moved along a trajectory curve which is convex toward the image plane side and the fourth lens group G4 is moved along a trajectory curve which is convex toward the object side when changing the magnification of the zoom lens from the wide angle end (short focal end) to the telephoto end (long focal end).

In this example 1, the focal length f of an entire optical system of the zoom lens, an F number F, and a half field angle ω are changed within a range of f=5.10 to 52.0, F=3.71 to 6.09, and w=39.0 to 4.54, respectively. An optical property of each optical element is as follows:

TABLE 1

OPTICAL PROPERTIES

| Surface No. | R | D | $N_d$ | $v_d$ | NOTE | | |
|---|---|---|---|---|---|---|---|
| 1 | 38.984 | 1.00 | 2.00330 | 28.27 | | E1 | G1 |
| 2 | 22.713 | 3.53 | 1.60300 | 65.44 | | E2 | |
| 3 | 265.820 | 0.10 | | | | | |
| 4 | 20.393 | 2.91 | 1.58913 | 61.15 | | E3 | |
| 5* | 87.586 | Variable DA | | | | | |
| 6* | 94.038 | 0.04 | 1.52020 | 52.02 | RESIN LAYER | E4 | G2 |
| 7 | 69.105 | 0.80 | 1.80610 | 40.93 | | | |
| 8 | 4.512 | 2.50 | | | | | |
| 9 | 144.119 | 2.55 | 1.76182 | 26.52 | | E5 | |
| 10 | −6.562 | 0.70 | 1.77250 | 49.60 | | E6 | |
| 11 | −33.585 | 0.04 | 1.52020 | 52.02 | RESIN LAYER | | |
| 12* | 1415.901 | Variable DB | | | | | |
| 13 | Aperture stop | Variable DC | | | | AD | |
| 14* | 6.614 | 3.58 | 1.48749 | 70.24 | | E7 | G3 |

TABLE 1-continued

OPTICAL PROPERTIES

| Surface No. | R | D | $N_d$ | $v_d$ | NOTE | |
|---|---|---|---|---|---|---|
| 15* | −10.616 | 0.10 | | | | |
| 16 | 15.373 | 2.50 | 1.69680 | 55.53 | E8 | |
| 17 | −9.347 | 0.80 | 1.66680 | 33.05 | E9 | |
| 18 | 5.572 | Variable DD | | | | |
| 19* | 9.803 | 0.80 | 1.86400 | 40.58 | E10 | G4 |
| 20 | 7.178 | 2.51 | 1.48749 | 70.24 | E11 | |
| 21 | −58.759 | Arbitrarily | | | | |
| 22 | ∞ | 0.30 | 1.51680 | 64.20 | | FM |
| 23 | ∞ | 0.50 | 1.50000 | 64.00 | | |
| 24 | ∞ | | | | | |

In Table 1, each of fifth, sixth, twelfth, fourteenth, fifteenth and nineteenth optical surfaces is aspheric and indicated by asterisk, and the parameters in the equation (16) for each aspheric surface are as follows. Aspheric surface parameters: the 5th surface:

K=0
$A_4$=7.67×10$^{-7}$
$A_6$=−4.28×10$^{-9}$
$A_8$=6.46×10$^{-11}$
$A_{10}$=−5.79×10$^{-13}$
$A_{12}$=2.25×10$^{-15}$ the sixth surface:
K=0
$A_4$=1.15×10$^{-4}$
$A_6$=−4.00×10$^{-6}$
$A_8$=2.21×10$^{-7}$
$A_{10}$=−7.66×10$^{-9}$
$A_{12}$=1.12×10$^{-10}$
$A_{14}$=−5.58×10$^{-13}$ The twelfth surface:
K=0
$A_4$=−6.74×10$^{-4}$
$A_6$=−2.73×10$^{-6}$
$A_8$=−6.70×10$^{-7}$
$A_{10}$=−3.16×10$^{-8}$ the fourteenth surface:
K=0
$A_4$=−5.70×10$^{-4}$
$A_6$=2.19×10$^{-5}$
$A_8$=−1.14×10$^{-6}$
$A_{10}$=7.28×10$^{-8}$ The fifteenth surface:
K=0
$A_4$=5.11×10$^{-4}$
$A_6$=2.89×10$^{-5}$
$A_8$=−1.42×10$^{-6}$
$A_{10}$=1.03×10$^{-7}$ the nineteenth surface:
K=0
$A_4$=1.44×10$^{-5}$
$A_6$=1.27×10$^{-6}$
$A_8$=−2.55×10$^{-8}$
$A_{10}$=3.47×10$^{-10}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table with changing the magnification.

TABLE 2

VARIABLE INTERVAL

| | WIDE ANGLE END | INTERMEDIATE FOCAL LENGTH | TELEPHOTO END |
|---|---|---|---|
| f | 5.10 | 16.28 | 51.98 |
| DA | 0.64 | 8.79 | 20.01 |
| DB | 9.50 | 2.29 | 0.80 |
| DC | 5.22 | 1.78 | 0.95 |
| DD | 3.25 | 5.11 | 16.62 |

Figure 2:
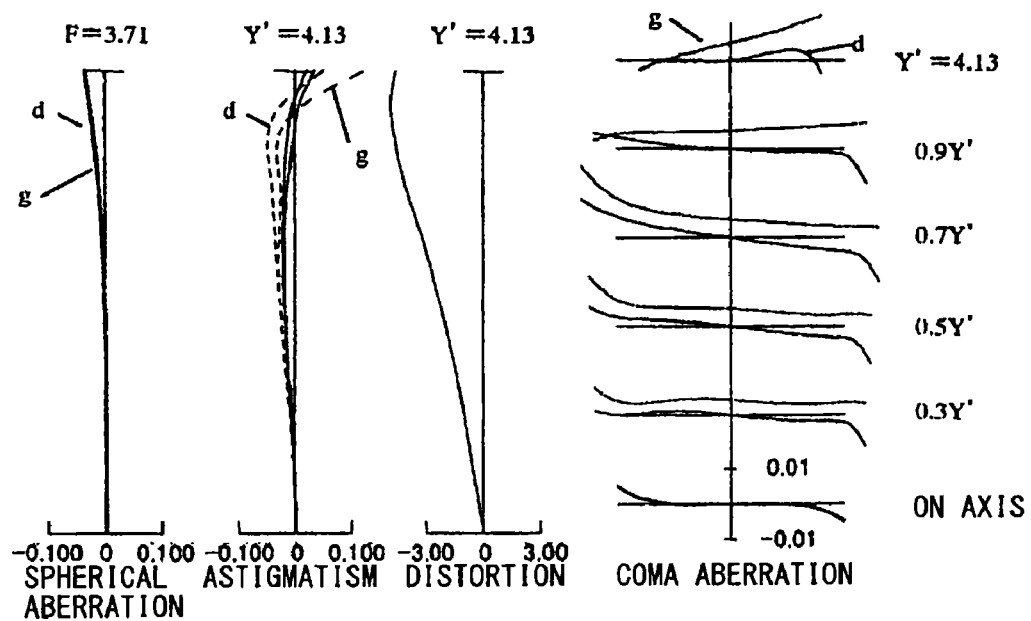
FIG. 2 is a view illustrating aberration curves of spherical aberration, astigmatism, distortion, and coma aberration in the zoom lens according to the example 1 or 11 at the wide angle end.
Figure 3:
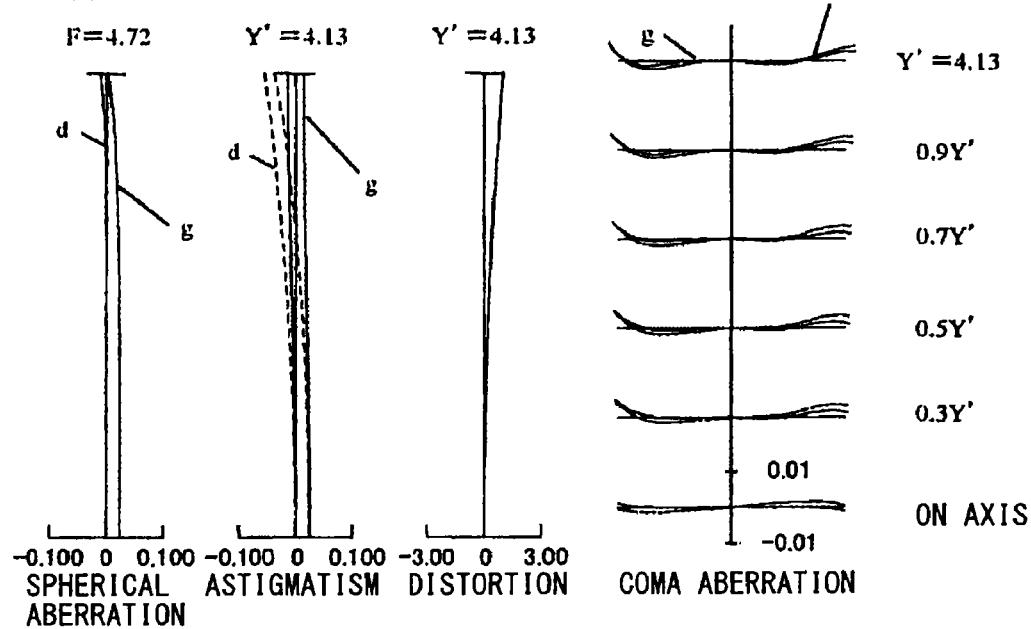
FIG. 3 is a view illustrating aberration curves of spherical aberration, astigmatism, distortion, and coma aberration in the zoom lens according to the example 1 or 11 at the intermediate focal length position.
Figure 4:
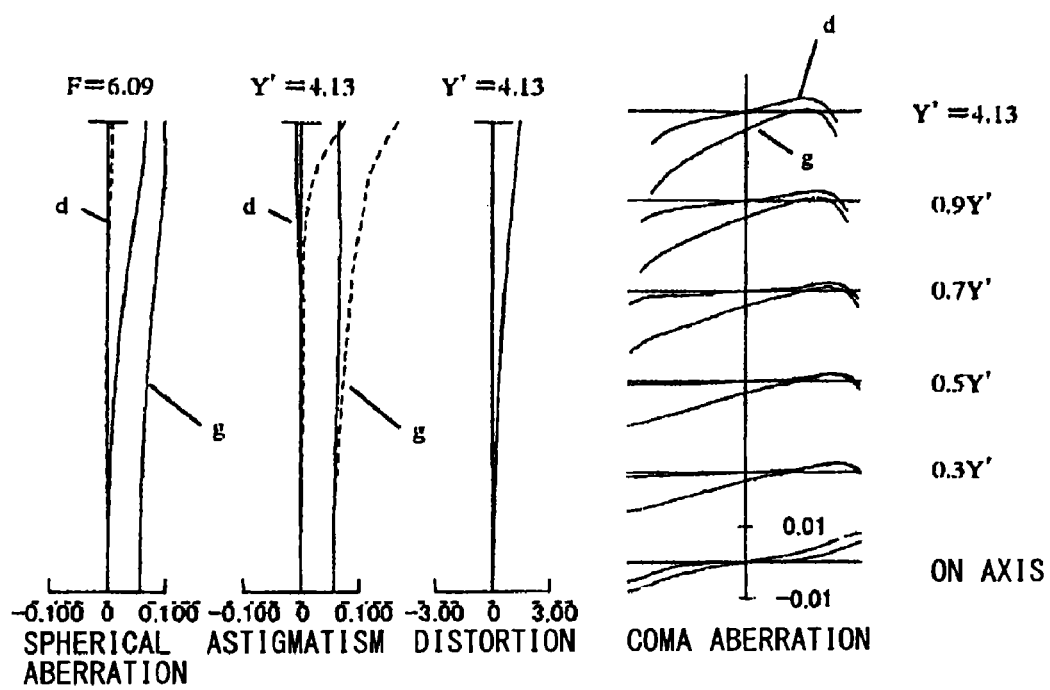
FIG. 4 is a view illustrating aberration curves of spherical aberration, astigmatism, distortion, and coma aberration in the zoom lens according to the example 1 or 11 at the telephoto end.

FIGS. 2, 3 and 4 show aberration curves of spherical aberration, astigmatism, distortion, and coma aberration at the wide angle end, the intermediate focal length position, and the telephoto end, respectively, in the zoom lens according to the example 1. In the spherical aberration curves in this example as well as the other examples, the broken line indicates a sine condition, in astigmatism curves, the solid line indicates a sagittal image plane, the broken line indicates a meridional image plane, the heavy line indicates a d-line, and the thin line indicates a g-line.

Example 2

Figure 5A:
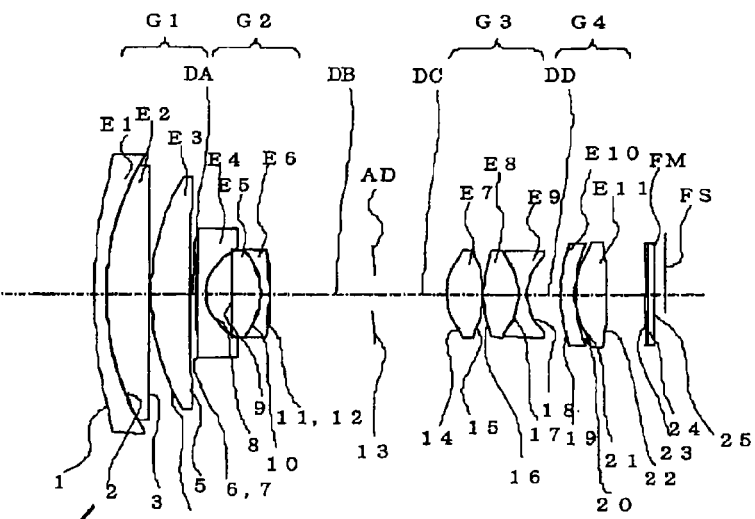
FIG. 5A is a schematic sectional view of a zoom lens according to an example 2, 6 or 12 at a wide angle end.
Figure 5B:
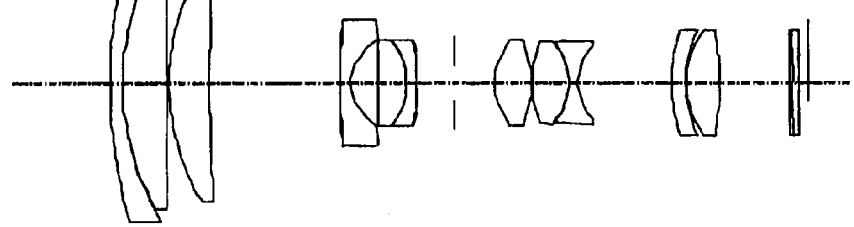
FIG. 5B is a schematic sectional view of the zoom lens according to the example 2, 6 or 12 at a predetermined intermediate focal length position.
Figure 5C:
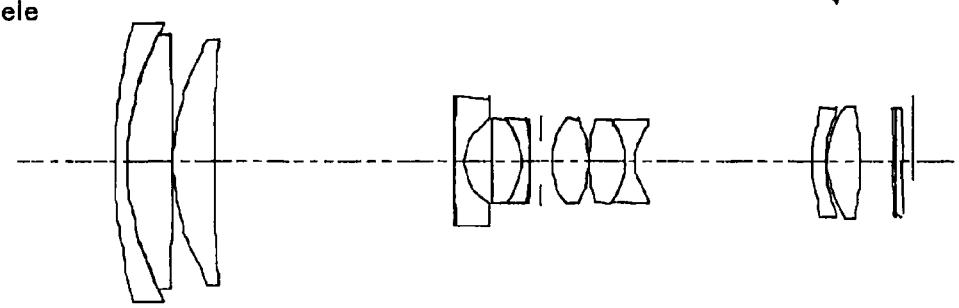
FIG. 5C is a schematic sectional view of the zoom lens according to the example 2, 6 or 12 at a telephoto end.

FIG. 5A to 5C are schematic views of lens configurations of the zoom lens according to the example 2 of the first embodiment of the present invention on a zooming trajectory when zooming from a wide angle end to a telephoto end via a predetermined intermediate focal length position, that is, FIG. 5A is a schematic sectional view of the zoom lens at the wide angle end, FIG. 5B is a schematic sectional view of the zoom lens at the predetermined intermediate focal length position, and FIG. 5C is a schematic sectional view of the zoom lens at the telephoto end. A left side of FIGS. 5A to 5C is an object side of the zoom lens.

The zoom lens shown in FIG. 5A to 5C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group. FIGS. 5A to 5C show reference numbers of each surface. In addition, the same reference numbers are independently used in each example for sake of simplicity and therefore the configuration indicated by the same reference number is not always the same configuration.

When changing the magnification of the zoom lens from the wide angle end (short focal end) to the telephoto end (long focal end), all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a double-convex positive meniscus lens having a stronger convex surface directed toward the object side of the zoom lens, and the third lens E3 provided with a positive meniscus lens having a convex surface toward the object side of the zoom lens and an aspheric surface at the image plane side in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens having an aspheric surface formed by applying a resin layer at the object side, the fifth lens E5 provided with a double-convex positive lens, and the sixth lens E6 provided with an aspheric lens having an aspheric surface formed by applying a resin layer to an image plane side surface of a negative meniscus lens having a convex surface directed toward the image plane side, in order from the object side. The fifth and sixth lenses E5, E6 are closely stuck and cemented together with each other to form a cemented lens formed by the two lenses.

The third lens group G3 includes the seventh lens E7 provided with a double-convex and -aspheric positive lens having a stronger convex surface at the object side, the eighth lens E8 provided with a double-convex positive lens having a stronger convex surface at the image plane side, and the ninth lens E9 provided with a double-concave negative lens having a stronger concave surface at the image plane side, in order from the object side. The eighth and ninth lenses E8, E9 are closely stuck and cemented together with each other to form a cemented lens formed by the two lenses.

That is, the configurations of this example 2 differ from that of the example 1 in that the second lens E2 disposed at a second position of the first lens group G1 from the object side is provided with the double-convex positive lens having the stronger convex surface directed toward the object side and the tenth lens E10 and the eleventh lens E11 of the fourth lens group G4 are not stuck and cemented with each other, that is, do not constitute the cemented lens in the example 2. The other configurations in the example 2 are the same as those in the example 1

The fourth lens group G4 includes the tenth lens E10 provided with a negative meniscus lens having an aspheric surface at the object side and a convex surface directed toward the object side, and the eleventh lens E11 provided with a double convex positive lens having a stronger convex surface directed toward the object side, in order from the object side.

In this case, as shown in FIGS. 5A to 5C, the first and third lens groups G1 and G3 are monotonously moved from the image plane side to the object side, the second lens group G2 is substantially monotonously moved to the image side, and the fourth lens group G4 is moved along a trajectory curve which is convex toward the object side when changing the magnification of the zoom lens from the wide angle end to the telephoto end.

In this example 2, the focal length f of an entire optical system of the zoom lens, an F number F, and a half field angle ω are changed within a range of f=5.10 to 52.50, F=3.61 to 6.08, and ω=39.0 to 4.54, respectively. An optical property of each optical element is as follows:

TABLE 3

OPTICAL PROPERTIES

| Surface No. | R | D | $N_d$ | $v_d$ | NOTE | |
|---|---|---|---|---|---|---|
| 1 | 52.273 | 1.03 | 2.00330 | 28.27 | E1 | G1 |
| 2 | 26.659 | 3.79 | 1.60300 | 65.44 | E2 | |
| 3 | −929.010 | 0.10 | | | | |
| 4 | 22.530 | 3.44 | 1.58913 | 61.15 | E3 | |
| 5* | 210.638 | Variable DA | | | | |
| 6* | 457.799 | 0.04 | 1.52020 | 52.02 RESIN LAYER | E4 | G2 |
| 7 | 156.173 | 0.80 | 1.80610 | 40.93 | | |
| 8 | 4.545 | 2.30 | | | | |
| 9 | 219.473 | 2.46 | 1.76182 | 26.52 | E5 | |
| 10 | −6.587 | 0.76 | 1.77250 | 49.60 | E6 | |
| 11 | −25.934 | 0.04 | 1.52020 | 52.02 RESIN LAYER | | |
| 12* | −117.013 | Variable DB | | | | |
| 13 | Aperture stop | Variable DC | | | | AD |
| 14* | 6.213 | 3.05 | 1.48749 | 70.24 | E7 | G3 |
| 15* | −8.856 | 0.10 | | | | |
| 16 | 14.468 | 3.01 | 1.73400 | 51.47 | E8 | |
| 17 | −6.253 | 0.80 | 1.80100 | 34.97 | E9 | |
| 18 | 5.302 | Variable DD | | | | |
| 19* | 16.153 | 1.20 | 1.90200 | 25.10 | E10 | G4 |
| 20 | 12.236 | 0.10 | | | | |
| 21 | 8.876 | 2.74 | 1.48749 | 70.24 | E11 | |
| 22 | −30.259 | Arbitrarily | | | | |
| 23 | ∞ | 0.30 | 1.51680 | 64.20 | | FM |
| 24 | ∞ | 0.50 | 1.50000 | 64.00 | | |
| 25 | ∞ | | | | | |

In Table 3, each of fifth, sixth, twelfth, fourteenth, fifteenth and nineteenth optical surfaces is aspheric and indicated by asterisk, and the parameters in the equation (16) for each aspheric surface are as follows. Aspheric surface parameters:
the 5th surface:
K=0
$A_4$=2.205540×10$^{-6}$
$A_6$=4.181840×10$^{-9}$
$A_8$=−1.494890×10$^{-19}$
$A_{10}$=1.522100×10$^{-12}$
$A_{12}$=−5.516210×10$^{-15}$
the sixth surface:
K=0
$A_4$=1.999680×10$^{-4}$
$A_6$=−1.122220×10$^{-5}$
$A_8$=4.160730×10$^{-7}$
$A_{10}$=−6.510170×10$^{-9}$
$A_{12}$=−5.021190×10$^{-11}$
$A_{14}$=1.590660×10$^{-12}$
The twelfth surface:
K=0
$A_4$=−6.659970×10$^{-4}$
$A_6$=−9.274390×10$^{-6}$
$A_8$=−4.062510×10$^{-8}$
$A_{10}$=−5.698790×10$^{-8}$
the fourteenth surface:
K=0
$A_4$=−7.967520×10$^{-4}$
$A_6$=1.099360×10$^{-5}$
$A_8$=−9.587750×10$^{-7}$
$A_{10}$=4.152840×10$^{-8}$
The fifteenth surface:
K=0
$A_4$=4.643910×10$^{-4}$
$A_6$=1.657550×10$^{-5}$
$A_8$=1.202080×10$^{-6}$
$A_{10}$=6.179880×10$^{-8}$
the nineteenth surface:
K=0
$A_4$=−3.955820×10$^{-5}$
$A_6$=1.598050×10$^{-6}$
$A_8$=−1.060610×10$^{-7}$
$A_{10}$=1.644690×10$^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table with changing the magnification.

TABLE 4

VARIABLE INTERVAL

| | WIDE ANGLE END | INTERMEDIATE FOCAL LENGTH | TELEPHOTO END |
|---|---|---|---|
| f | 5.10 | 16.28 | 51.98 |
| DA | 0.64 | 11.02 | 20.25 |
| DB | 9.00 | 3.09 | 0.80 |
| DC | 6.45 | 3.34 | 0.95 |
| DD | 2.95 | 7.81 | 14.83 |

Figure 6:
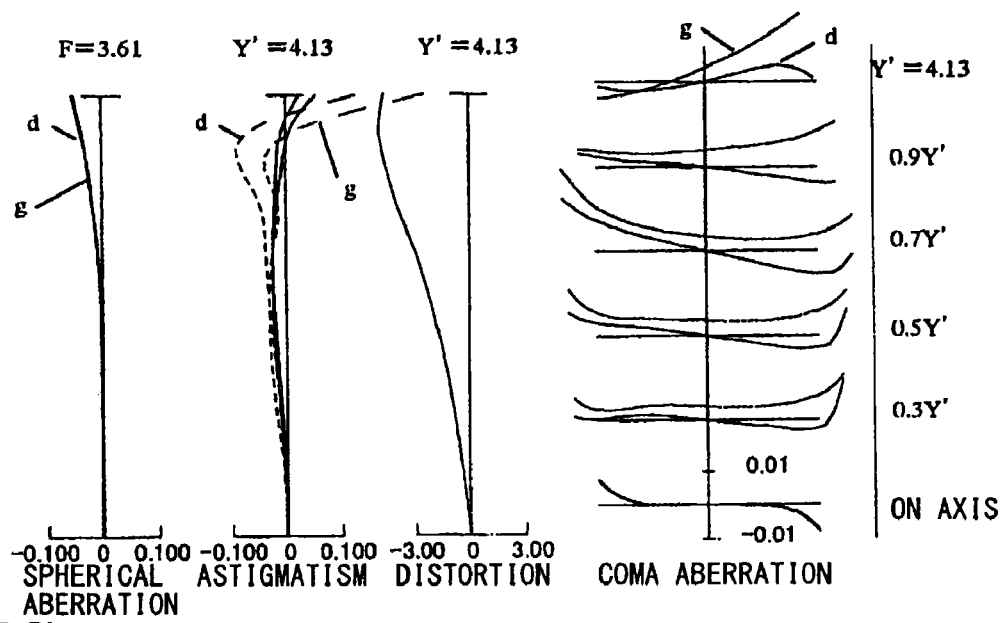
FIG. 6 is a view illustrating aberration curves of spherical aberration, astigmatism, distortion, and coma aberration in the zoom lens according to the example 2, 6 or 12 at the wide angle end.
Figure 7:
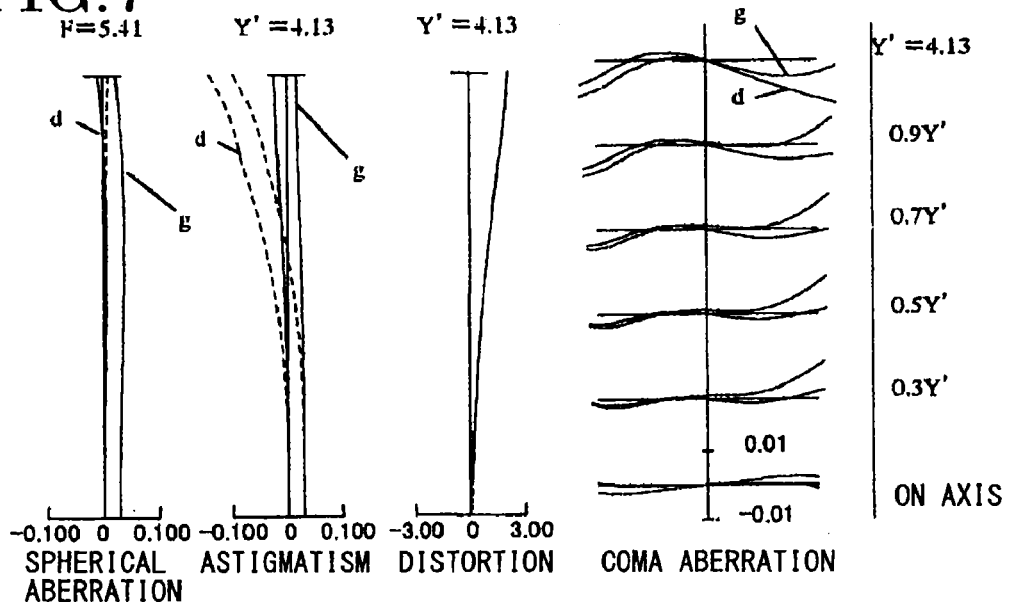
FIG. 7 is a view illustrating aberration curves of spherical aberration, astigmatism, distortion, and coma aberration in the zoom lens according to the example 2, 6 or 12 at the intermediate focal length position.
Figure 8:
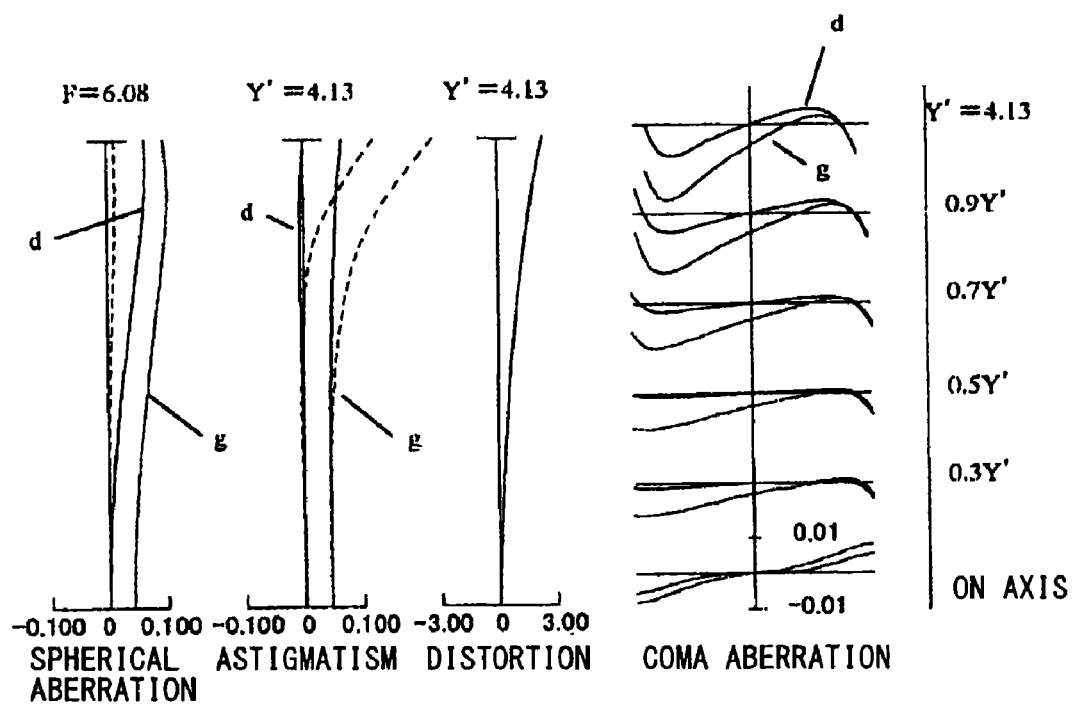
FIG. 8 is a view illustrating aberration curves of spherical aberration, astigmatism, distortion, and coma aberration in the zoom lens according to the example 2, 6 or 12 at the telephoto end.

FIGS. 6, 7 and 8 show aberration curves of spherical aberration, astigmatism, distortion, and coma aberration at the wide angle end, the intermediate focal length position, and the telephoto end, respectively, in the zoom lens according to the example 2. Similarly to the example 1, in the spherical aberration curves in this example, the broken line indicates a sine condition, in astigmatism curves, the solid line indicates a sagittal image plane, the broken line indicates a meridional image plane, the heavy line indicates a d-line, and the thin line indicates a g-line.

Example 3

FIG. 9A to 9C are schematic views of lens configurations of the zoom lens according to the example 3 of the first embodiment of the present invention on a zooming trajectory when zooming from a wide angle end to a telephoto end via a predetermined intermediate focal length position, that is, FIG. 9A is a schematic sectional view of the zoom lens at the wide angle end, FIG. 9B is a schematic sectional view of the zoom lens at the predetermined intermediate focal length position, and FIG. 9C is a schematic sectional view of the zoom lens at the telephoto end. A left side of FIGS. 9A to 9C is an object side of the zoom lens.

The zoom lens shown in FIG. 9A to 9C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group. FIGS. 9A to 9C show reference numbers of each surface. In addition, the same reference numbers are independently used in each example for sake of simplicity and therefore the configuration indicated by the same reference number is not always the same configuration.

When changing the magnification of the zoom lens from the wide angle end to the telephoto end, all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens and an aspheric surface at the image plane side in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens having an aspheric surface formed by applying a resin layer at the object side, the fifth lens E5 provided with a double-convex positive lens, and the sixth lens E6 provided with an aspheric lens having an aspheric surface formed by applying a resin layer to an image plane side surface of a negative meniscus lens having a convex surface directed toward the image plane side, in order from the object side. The fifth and sixth lenses E5, E6 are closely stuck and cemented together with each other to form a cemented lens formed by the two lenses.

The third lens group G3 includes the seventh lens E7 provided with a double-convex and -aspheric positive lens having a stronger convex surface at the object side, the eighth lens E8 provided with a double-convex positive lens having a stronger convex surface at the image plane side, and the ninth lens E9 provided with a double-concave negative lens having a stronger concave surface at the image plane side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having an aspheric surface at the object side and a convex surface directed toward the object side, and the eleventh lens E11 provided with a double convex positive lens having a stronger convex surface directed toward the object side, in order from the object side. The tenth and eleventh lenses E10, E11 are closely stuck and cemented together with each other to form a cemented lens formed by the two lenses. That is, the configurations of this example 3 are the same as those of the example 1.

In this case, as shown in FIGS. 9A to 9C, the first and third lens groups G1 and G3 are monotonously moved from the image plane side to the object side, the second lens group G2 is moved along a trajectory curve which is convex toward the image plane side, and the fourth lens group G4 is moved along a trajectory curve which is convex toward the object side when changing the magnification of the zoom lens from the wide angle end to the telephoto end.

In this example 3, the focal length f of an entire optical system of the zoom lens, an F number F, and a half field angle w are changed within a range of f=5.10 to 51.98, F=3.40 to 6.15, and w=39.0 to 4.54, respectively. An optical property of each optical element is as follows:

In Table 5, each of fifth, sixth, twelfth, fourteenth, fifteenth and nineteenth optical surfaces is aspheric and indicated by asterisk, and the parameters in the equation (16) for each aspheric surface are as follows. Aspheric surface parameters:
the 5th surface:
$K=0$
$A_4=1.947850\times10^{-6}$
$A_6=-5.051910\times10^{-9}$
$A_8=4.847070\times10^{-11}$
$A_{10}=-2.800590\times10^{13}$
$A_{12}=1.399070\times10^{-15}$
the sixth surface:
$K=0$
$A_4=1.313170\times10^{-4}$
$A_6=-5.126640\times10^{-6}$
$A_8=2.369100\times10^{-7}$
$A_{10}=-7.633340\times10^{-9}$
$A_{12}=1.106480\times10^{-10}$
$A_{14}=-5.583560\times10^{-13}$
The twelfth surface:
$K=0$
$A_4=-7.425700\times10^{-4}$
$A_6=-7.391420\times10^{-7}$
$A_8=-1.082630\times10^{-6}$
$A_{10}=-3.252710\times10^{-8}$
the fourteenth surface:
$K=0$
$A_4=-6.802070\times10^{-4}$
$A_6=2.072020\times10^{-5}$
$A_8=-1.126100\times10^{-6}$
$A_{10}=5.500980\times10^{-8}$
The fifteenth surface:
$K=0$
$A_4=4.961470\times10^{-4}$
$A_6=2.754750\times10^{-5}$
$A_8=-1.508580\times10^{-6}$
$A_{10}=8.474430\times10^{-8}$
the nineteenth surface:
$K=0$
$A_4=2.131920\times10^{-5}$

TABLE 5

OPTICAL PROPERTIES

| Surface No | R | D | $N_d$ | $v_d$ | NOTE | |
|---|---|---|---|---|---|---|
| 1 | 41.760 | 1.00 | 2.00330 | 28.27 | E1 | G1 |
| 2 | 20.716 | 3.93 | 1.60300 | 65.44 | E2 | |
| 3 | 861.946 | 0.10 | | | | |
| 4 | 18.175 | 2.66 | 1.69680 | 55.53 | E3 | |
| 5* | 88.494 | Variable DA | | | | |
| 6* | 154.670 | 0.04 | 1.52020 | 52.02 RESIN LAYER | E4 | G2 |
| 7 | 93.456 | 0.80 | 1.80610 | 40.93 | | |
| 8 | 4.400 | 2.39 | | | | |
| 9 | 170.030 | 2.55 | 1.76182 | 26.52 | E5 | |
| 10 | −5.964 | 0.70 | 1.77250 | 49.60 | E6 | |
| 11 | −36.272 | 0.04 | 1.52020 | 52.02 RESIN LAYER | | |
| 12* | 362.612 | Variable DB | | | | |
| 13 | Aperture stop | Variable DC | | | AD | |
| 14* | 6.568 | 3.52 | 1.48749 | 70.24 | E7 | G3 |
| 15* | −9.669 | 0.10 | | | | |
| 16 | 18.622 | 2.57 | 1.69680 | 55.53 | E8 | |
| 17 | −8.754 | 0.80 | 1.66680 | 33.05 | E9 | |
| 18 | 5.643 | Variable DD | | | | |
| 19* | 9.804 | 0.79 | 1.86400 | 40.58 | E10 | G4 |
| 20 | 7.208 | 2.59 | 1.48749 | 70.24 | E11 | |
| 21 | −51.711 | Arbitrarily | | | | |
| 22 | ∞ | 0.30 | 1.51680 | 64.20 | FM | |
| 23 | ∞ | 0.50 | 1.50000 | 64.00 | | |
| 24 | ∞ | | | | | |

$A_6=1.263390\times10^6$
$A_8=-3.663520\times10^{-8}$
$A_{10}=7.507270\times10^{-10}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table with changing the magnification.

TABLE 6

| | VARIABLE INTERVAL | | |
|---|---|---|---|
| | WIDE ANGLE END | INTERMEDIATE FOCAL LENGTH | TELEPHOTO END |
| f | 5.10 | 16.28 | 51.98 |
| DA | 0.64 | 7.70 | 15.92 |
| DB | 8.79 | 1.56 | 0.80 |
| DC | 5.75 | 2.99 | 0.95 |
| DD | 2.70 | 4.35 | 16.87 |

Figure 10:
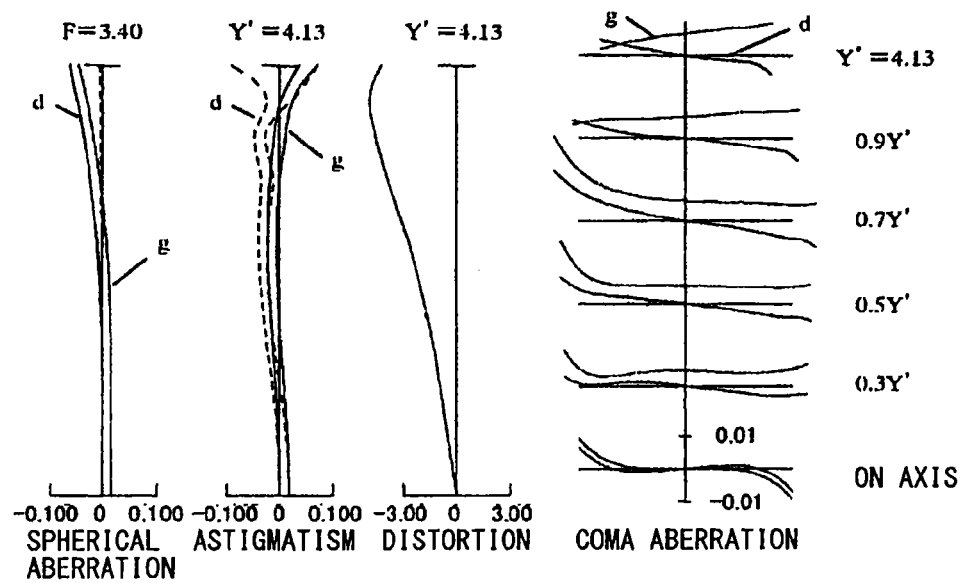
FIG. 10 is a view illustrating aberration curves of spherical aberration, astigmatism, distortion, and coma aberration in the zoom lens according to the example 3, 7 or 13 at the wide angle end.
Figure 11:
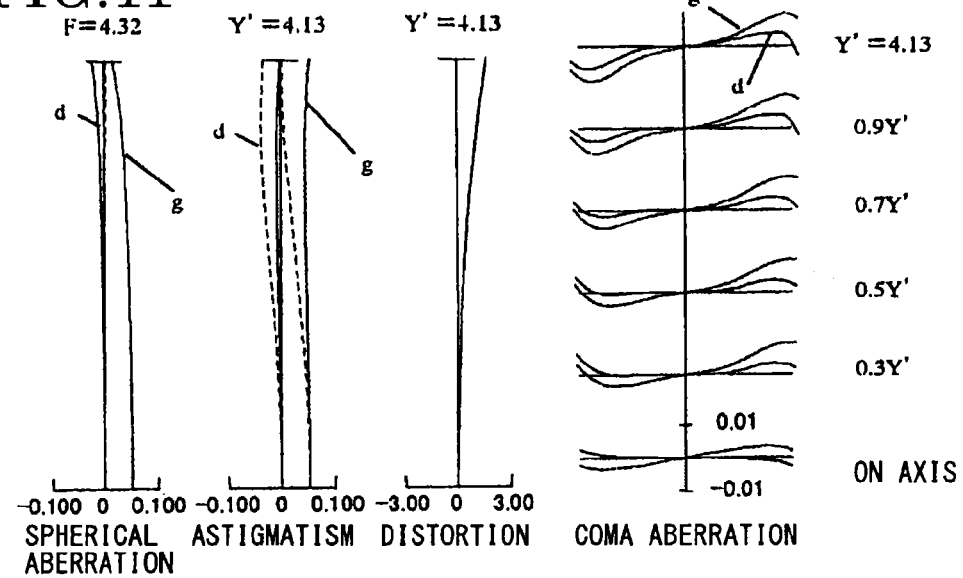
FIG. 11 is a view illustrating aberration curves of spherical aberration, astigmatism, distortion, and coma aberration in the zoom lens according to the example 3, 7 or 13 at the intermediate focal length position.
Figure 12:
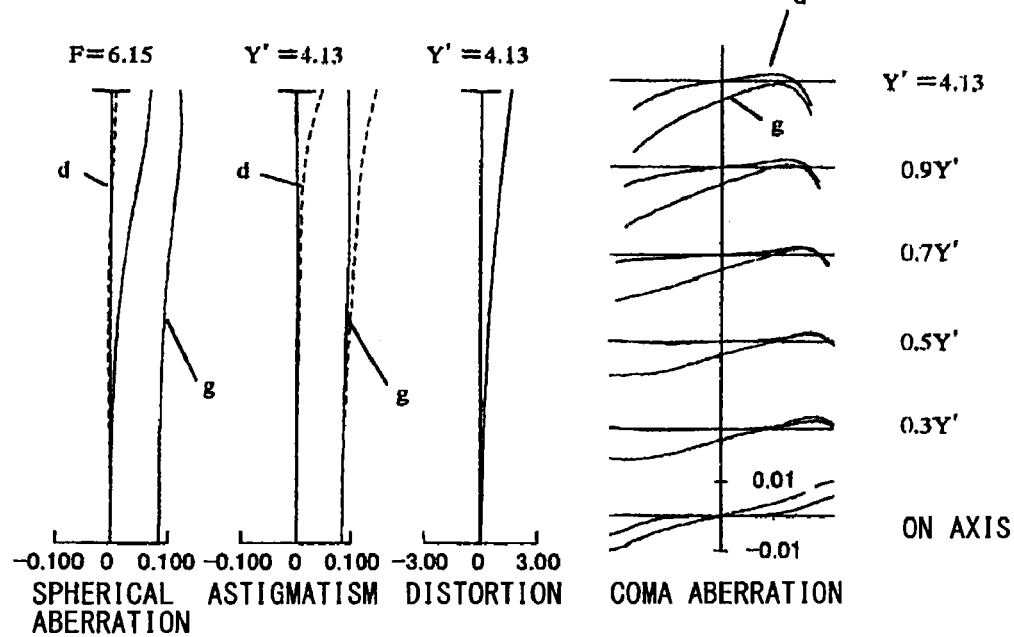
FIG. 12 is a view illustrating aberration curves of spherical aberration, astigmatism, distortion, and coma aberration in the zoom lens according to the example 3, 7 or 13 at the telephoto end.

FIGS. 10, 11 and 12 show aberration curves of spherical aberration, astigmatism, distortion, and coma aberration at the wide angle end, the intermediate focal length position, and the telephoto end, respectively, in the zoom lens according to the example 3. Similarly to the example 1, in the spherical aberration curves in this example, the broken line indicates a sine condition, in astigmatism curves, the solid line indicates a sagittal image plane, the broken line indicates a meridional image plane, the heavy line indicates a d-line, and the thin line indicates a g-line.

Example 4

Figure 13A:
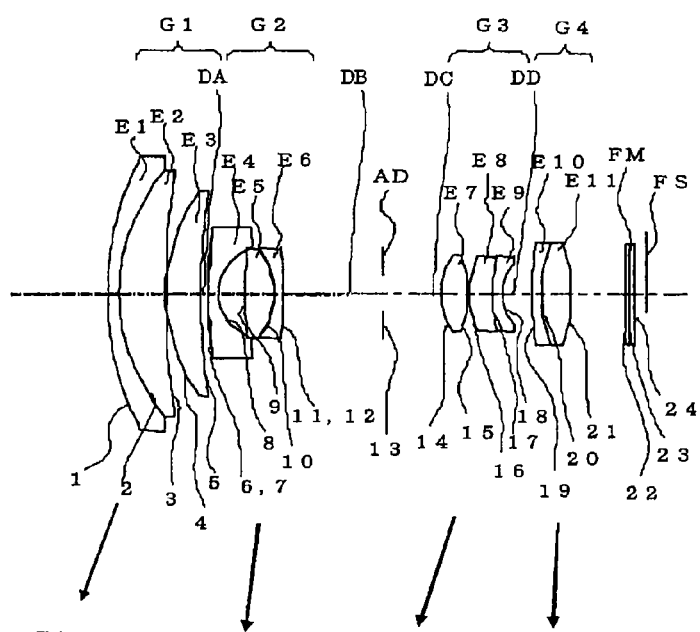
FIG. 13A is a schematic sectional view of a zoom lens according to an example 4, 8 or 14 at a wide angle end.
Figure 13B:
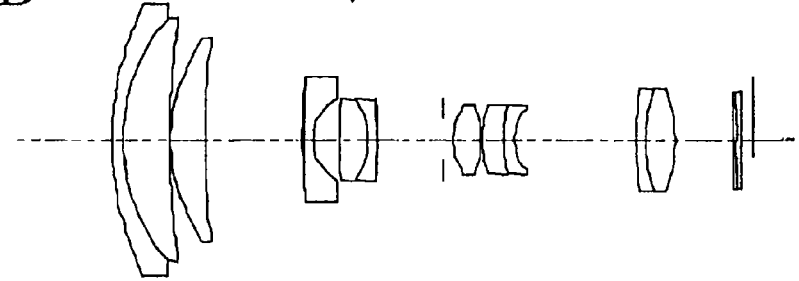
FIG. 13B is a schematic sectional view of the zoom lens according to the example 4, 8 or 14 at a predetermined intermediate focal length position.
Figure 13C:
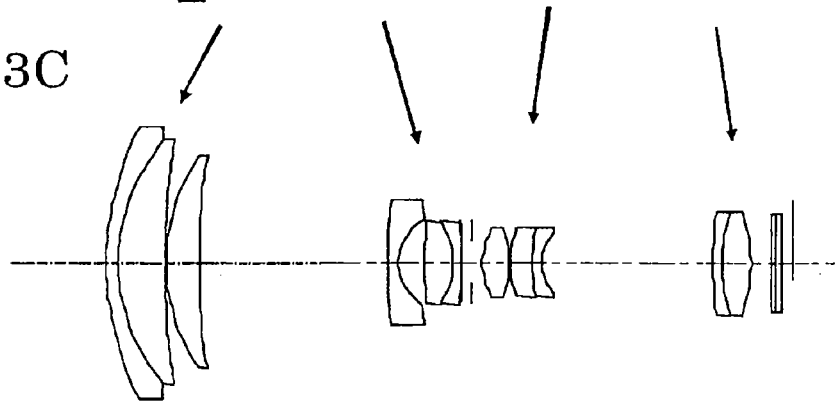
FIG. 13C is a schematic sectional view of the zoom lens according to the example 4, 8 or 14 at a telephoto end.

FIG. 13A to 13C are schematic views of lens configurations of the zoom lens according to the example 4 of the first embodiment of the present invention on a zooming trajectory when zooming from a wide angle end to a telephoto end via a predetermined intermediate focal length position, that is, FIG. 13A is a schematic sectional view of the zoom lens at the wide angle end, FIG. 13B is a schematic sectional view of the zoom lens at the predetermined intermediate focal length position, and FIG. 13C is a schematic sectional view of the zoom lens at the telephoto end. A left side of FIGS. 13A to 13C is an object side of the zoom lens.

The zoom lens shown in FIG. 13A to 13C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group. FIGS. 13A to 13C show reference numbers of each surface. In addition, the same reference numbers are independently used in each example for sake of simplicity and therefore the configuration indicated by the same reference number is not always the same configuration.

When changing the magnification of the zoom lens from the wide angle end to the telephoto end, all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens and an aspheric surface at the image plane side in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens having an aspheric surface formed by applying a resin layer at the object side, the fifth lens E5 provided with a double-convex positive lens, and the sixth lens E6 provided with an aspheric lens having an aspheric surface formed by applying a resin layer to an image plane side surface of a negative meniscus lens having a convex surface directed toward the image plane side, in order from the object side. The fifth and sixth lenses E5, E6 are closely stuck and cemented together with each other to form a cemented lens formed by the two lenses.

The third lens group G3 includes the seventh lens E7 provided with a double-convex and -aspheric positive lens having a stronger convex surface at the object side, the eighth lens E8 provided with a positive meniscus lens having a convex surface directed toward the object side, and the ninth lens E9 provided with a negative meniscus lens having a convex surface directed toward the object side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having an aspheric surface at the object side and a convex surface directed toward the object side, and the eleventh lens E11 provided with a double convex positive lens having a stronger convex surface directed toward the object side, in order from the object side. The tenth and eleventh lenses E10, E11 are closely stuck and cemented together with each other to form a cemented lens formed by the two lenses.

In this case, as shown in FIGS. 13A to 13C, the first and third lens groups G1 and G3 are moved from the image plane side to the object side, the second lens group G2 is moved along a trajectory curve which is convex toward the object side, and the fourth lens group G4 is moved along a trajectory curve which is convex toward the object side when changing the magnification of the zoom lens from the wide angle end to the telephoto end.

In this example 4, the focal length f of an entire optical system of the zoom lens, an F number F, and a half field angle ω are changed within a range of f=5.10 to 51.98, F=3.20 to 5.86, and ω=39.0 to 4.54, respectively. An optical property of each optical element is as follows:

TABLE 7

OPTICAL PROPERTIES

| Surface No. | R | D | $N_d$ | $v_d$ | NOTE | | |
|---|---|---|---|---|---|---|---|
| 1 | 30.846 | 1.00 | 1.80809 | 22.76 | | E1 | G1 |
| 2 | 19.068 | 3.98 | 1.62041 | 60.29 | | E2 | |
| 3 | 80.811 | 0.10 | | | | | |
| 4 | 18.597 | 2.91 | 1.58913 | 61.13 | | E3 | |
| 5* | 80.762 | Variable DA | | | | | |
| 6* | 63.011 | 0.04 | 1.52020 | 52.02 | RESIN LAYER | E4 | G2 |
| 7 | 62.097 | 0.80 | 1.88300 | 40.76 | | | |
| 8 | 4.626 | 2.27 | | | | | |
| 9 | 56.421 | 2.43 | 1.80809 | 22.76 | | E5 | |
| 10 | −7.218 | 0.70 | 1.88300 | 40.76 | | E6 | |
| 11 | −49.509 | 0.04 | 1.52020 | 52.02 | RESIN LAYER | | |
| 12* | 93.442 | Variable DB | | | | | |
| 13 | Aperture stop | Variable DC | | | | AD | |
| 14* | 5.959 | 2.34 | 1.48749 | 70.24 | | E7 | G3 |
| 15* | −9.380 | 0.10 | | | | | |
| 16 | 9.248 | 1.93 | 1.75700 | 47.82 | | E8 | |
| 17 | 17.852 | 0.80 | 1.80518 | 25.42 | | E9 | |
| 18 | 4.421 | Variable DD | | | | | |
| 19* | 37.693 | 0.80 | 1.90200 | 25.10 | | E10 | G4 |
| 20 | 15.561 | 2.47 | 1.69100 | 54.82 | | E11 | |
| 21 | −16.171 | Arbitrarily | | | | | |
| 22 | ∞ | 0.30 | 1.51680 | 64.20 | | FM | |
| 23 | ∞ | 0.50 | 1.50000 | 64.00 | | | |
| 24 | ∞ | | | | | | |

In Table 7, each of fifth, sixth, twelfth, fourteenth, fifteenth and nineteenth optical surfaces is aspheric and indicated by asterisk, and the parameters in the equation (16) for each aspheric surface are as follows. Aspheric surface parameters: the 5th surface:

K=0
$A_4$=2.782880×10$^{-6}$
$A_6$=4.555510×10$^4$
$A_8$=−1.216870×10$^{-9}$
$A_{10}$=1.401630×10$^{-11}$
$A_{12}$=−6.039240×10$^{-14}$ the sixth surface:
K=0
$A_4$=3.152380×10$^{-5}$
$A_6$=−3.662650×10$^{-6}$
$A_8$=2.531970×10$^{-7}$
$A_{10}$=−8.202700×10$^{-9}$
$A_{12}$=1.148300×10$^{10}$
$A_{14}$=−5.583560×10$^{-13}$ The twelfth surface:
K=0
$A_4$=−8.433420×10$^{-4}$
$A_6$=1.135520×10$^{-6}$
$A_8$=−7.688370×10$^{-7}$
$A_{10}$=−2.418360×10$^{-8}$ the fourteenth surface:
K=0
$A_4$=−9.876610×10$^{-4}$
$A_6$=1.455240×10$^{-5}$
$A_8$=−7.549500×10$^{-7}$
$A_{10}$=−8.738070×10$^{-8}$ The fifteenth surface:
K=0
$A_4$=4.364070×10$^{-4}$
$A_6$=9.191770×10$^{-6}$
$A_8$=7.110060×10$^{-7}$
$A_{10}$=−1.496030×10$^{-7}$ the nineteenth surface:
K=0
$A_4$=−6.916510×10$^{-6}$
$A_6$=6.400200×10$^{-6}$
$A_8$=−3.300830×10$^{-7}$
$A_{10}$=6.589080×10$^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table with changing the magnification.

TABLE 8

VARIABLE INTERVAL

| | WIDE ANGLE END | INTERMEDIATE FOCAL LENGTH | TELEPHOTO END |
|---|---|---|---|
| f | 5.10 | 16.28 | 51.98 |
| DA | 0.64 | 7.70 | 15.92 |
| DB | 8.79 | 1.56 | 0.80 |
| DC | 5.75 | 2.99 | 0.95 |
| DD | 2.70 | 4.35 | 16.87 |

Figure 14:
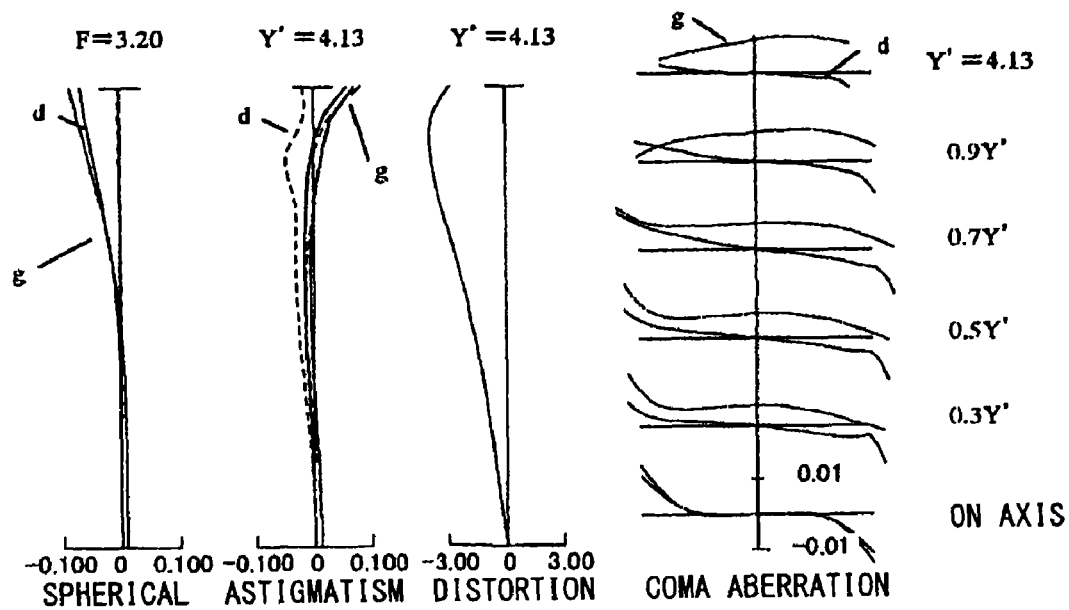
FIG. 14 is a view illustrating aberration curves of spherical aberration, astigmatism, distortion, and coma aberration in the zoom lens according to the example 4, 8 or 14 at the wide angle end.
Figure 15:
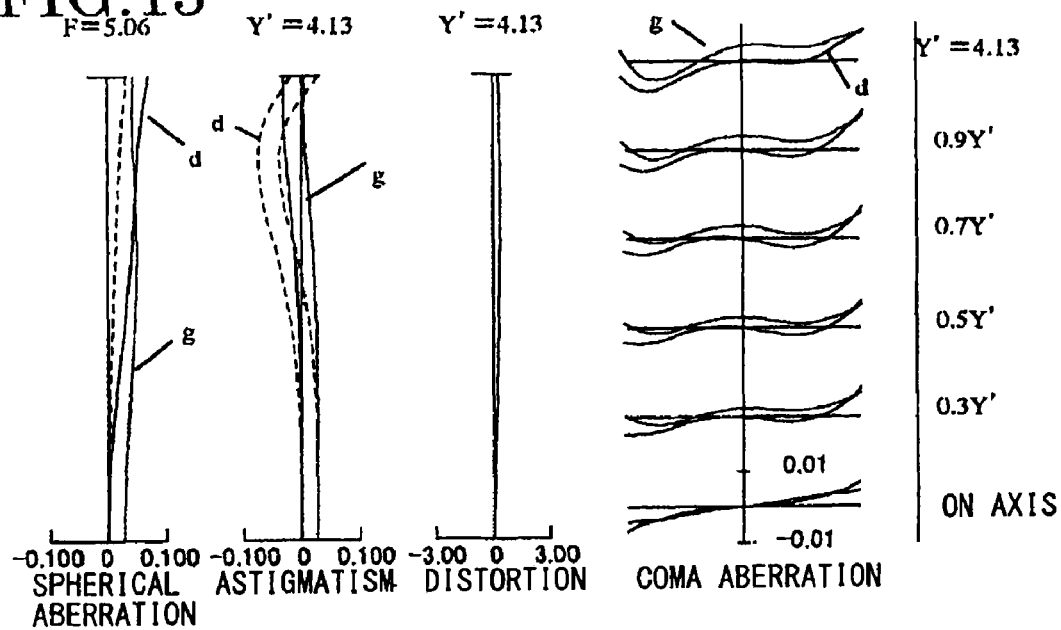
FIG. 15 is a view illustrating aberration curves of spherical aberration, astigmatism, distortion, and coma aberration in the zoom lens according to the example 4, 8 or 14 at the intermediate focal length position.
Figure 16:
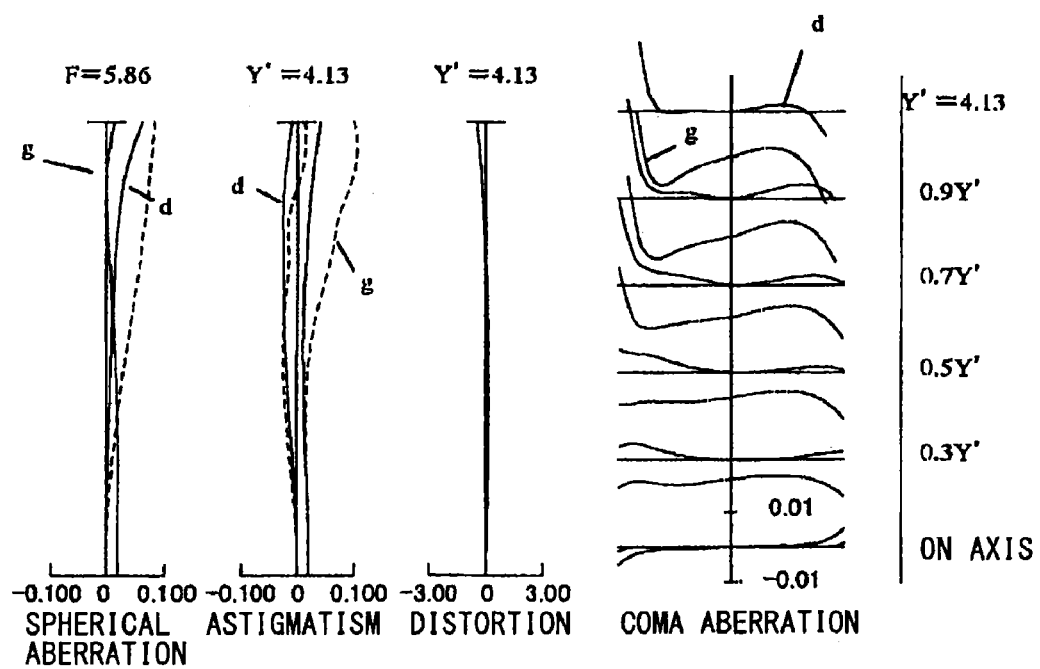
FIG. 16 is a view illustrating aberration curves of spherical aberration, astigmatism, distortion, and coma aberration in the zoom lens according to the example 4, 8 or 14 at the telephoto end.

FIGS. 14, 15 and 16 show aberration curves of spherical aberration, astigmatism, distortion, and coma aberration at the wide angle end, the intermediate focal length position, and the telephoto end, respectively, in the zoom lens according to the example 4. Similarly to the example 1, in the spherical aberration curves in this example, the broken line indicates a sine condition, in astigmatism curves, the solid line indicates a sagittal image plane, the broken line indicates a meridional image plane, the heavy line indicates a d-line, and the thin line indicates a g-line.

The following table shows values of the conditions (1) to (3), (8) and (9) according to the first embodiment in the examples 1 to 4. The values of the conditions are, more specifically, fl/ft of the condition (1), a value of vd1ave of the condition (2), Tpr of the condition (3), ft/fw of the condition (8), and Y'/fw of the condition (9).

TABLE 9

|  | Example 1 | Example 2 | Example 3 | Example 4 |
|---|---|---|---|---|
| Condition (1) | 0.69 | 0.68 | 0.55 | 0.59 |
| Condition (2) | 51.50 | 51.59 | 49.63 | 48.03 |
| Condition (3) | 1.28 | 1.28 | 1.19 | 1.13 |
| Condition (8) | 10.19 | 10.30 | 10.19 | 10.19 |
| Condition (9) | 0.81 | 0.81 | 0.81 | 0.81 |

The above described values of the parameters according to the conditions (1) to (3), (8) and (9) in the zoom lens of each example are within ranges of the conditions, respectively.

Example 5

In each of the examples 5 to 10 of the zoom lens according to the second embodiment of the present invention, a configuration and specific numerical examples are shown.

Figure 17A:
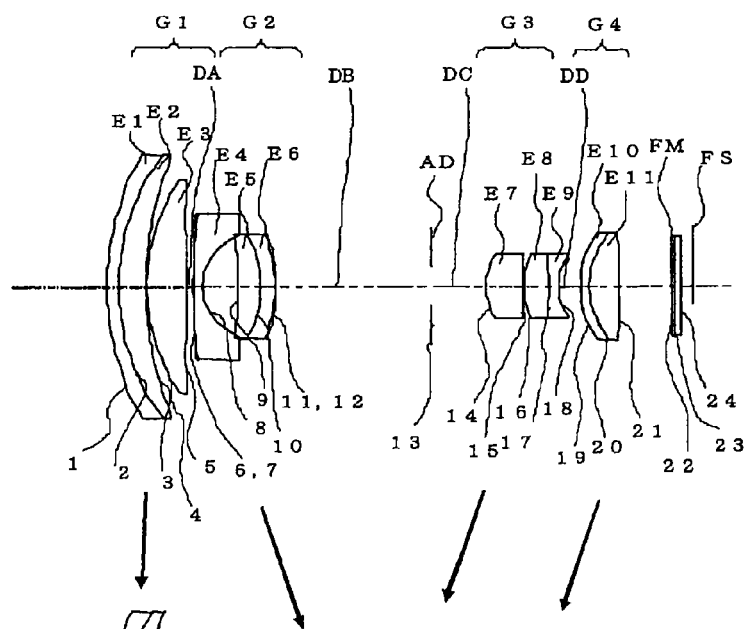
FIG. 17A is a schematic sectional view of a zoom lens according to an example 5 at a wide angle end.
Figure 17B:
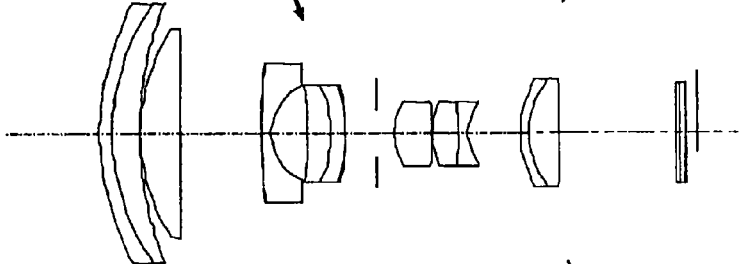
FIG. 17B is a schematic sectional view of the zoom lens according to the example 5 at a predetermined intermediate focal length position.
Figure 17C:
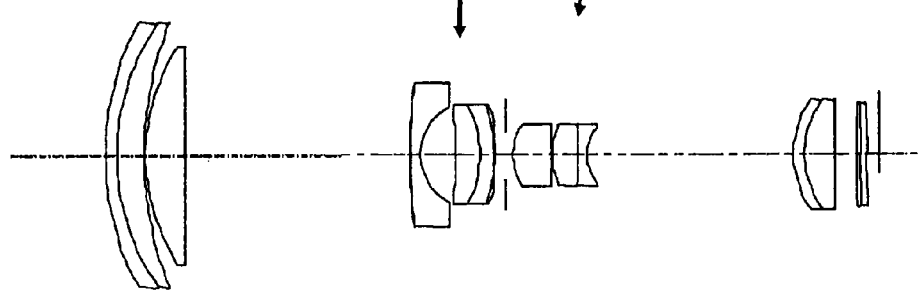
FIG. 17C is a schematic sectional view of the zoom lens according to the example 5 at a telephoto end.

FIG. 17A to 17C are schematic views of lens configurations of the zoom lens according to the example 5 on a zooming trajectory when zooming from a wide angle end to a telephoto end via a predetermined intermediate focal length position, that is, FIG. 17A is a schematic sectional view of the zoom lens at the wide angle end, FIG. 17B is a schematic sectional view of the zoom lens at the predetermined intermediate focal length position, and FIG. 17C is a schematic sectional view of the zoom lens at the telephoto end. A left side of FIGS. 17A to 17C is an object side of the zoom lens.

The zoom lens shown in FIG. 17A to 17C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group. FIGS. 17A to 17C show reference numbers of each surface. In addition, the same reference numbers used in the FIGS. 17A to 17C are independently used in each example for sake of simplicity and therefore the configuration indicated by the same reference number is not always the same configuration.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side, the second lens E2 provided with a positive meniscus lens having a convex surface directed toward the object side, and the third lens E3 provided with a double-convex positive lens having a stronger convex surface toward the object side and an aspheric surface at the image plane side in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens having an aspheric surface formed by applying a resin layer at the object side, the fifth lens E5 provided with a positive meniscus lens having a convex surface directed toward the image plane side, and the sixth lens E6 provided with an aspheric lens having an aspheric surface formed by applying a resin layer to an image plane side surface of a negative meniscus lens having a convex surface directed toward the image plane side, in order from the object side. The fifth and sixth lenses E5, E6 are closely stuck and cemented together with each other to form a cemented lens formed by the two lenses.

The third lens group G3 includes the seventh lens E7 provided with a double-convex and -aspheric positive lens having a stronger convex surface at the object side, the eighth lens E8 provided with a double-convex positive lens having a stronger convex surface at the object side, and the ninth lens E9 provided with a double-concave negative lens having a stronger concave surface at the image plane side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having an aspheric surface at the object side and a convex surface directed toward the object side, and the eleventh lens E11 provided with a double convex positive lens having a stronger convex surface directed toward the object side, in order from the object side. The tenth and eleventh lenses E10, E11 are closely stuck and cemented together with each other to form a cemented lens formed by the two lenses.

In this case, as shown in FIGS. 17A to 17C, the first and third lens groups G1 and G3 are moved from the image plane side to the object side, and the second lens group G2 is moved along a trajectory curve which is convex toward the image plane side and the fourth lens group G4 is moved along a trajectory curve which is convex toward the object side when changing the magnification of the zoom lens from the wide angle end to the telephoto end.

In this example 5, the focal length f of an entire optical system of the zoom lens, an F number F, and a half field angle w are changed within a range of f=5.09 to 52.0, F=3.63 to 6.08, and w=39.0 to 4.54, respectively. An optical property of each optical element is as follows:

TABLE 10

| OPTICAL PROPERTIES | | | | | | |
|---|---|---|---|---|---|---|
| Surface No. | R | D | $N_d$ | $v_d$ | NOTE | |
| 1 | 28.396 | 1.00 | 1.92286 | 18.90 | E1 | G1 |
| 2 | 23.008 | 2.34 | 1.60300 | 65.44 | E2 | |

TABLE 10-continued

OPTICAL PROPERTIES

| Surface No. | R | D | $N_d$ | $v_d$ | NOTE | | |
|---|---|---|---|---|---|---|---|
| 3 | 37.049 | 0.10 | | | | | |
| 4 | 20.218 | 3.37 | 1.49700 | 81.54 | | E3 | |
| 5* | −625.344 | Variable DA | | | | | |
| 6* | 74.770 | 0.04 | 1.52020 | 52.02 | RESIN LAYER | E4 | G2 |
| 7 | 74.964 | 0.80 | 1.88300 | 40.76 | | | |
| 8 | 5.158 | 3.15 | | | | | |
| 9 | −38.570 | 2.03 | 1.92286 | 18.90 | | E5 | |
| 10 | −10.891 | 1.27 | 2.00330 | 28.27 | | E6 | |
| 11 | −16.419 | 0.04 | 1.52020 | 52.02 | RESIN LAYER | | |
| 12* | −37.401 | Variable DB | | | | | |
| 13 | Aperture stop | Variable DC | | | | AD | |
| 14* | 5.881 | 3.28 | 1.49700 | 81.54 | | E7 | G3 |
| 15* | −19.461 | 0.10 | | | | | |
| 16 | 8.590 | 2.14 | 1.60300 | 65.44 | | E8 | |
| 17 | −35.095 | 0.80 | 1.74950 | 35.28 | | E9 | |
| 18 | 4.744 | Variable DD | | | | | |
| 19* | 10.369 | 0.80 | 1.90200 | 25.10 | | E10 | G4 |
| 20 | 8.686 | 2.68 | 1.49700 | 81.54 | | E11 | |
| 21 | −79.202 | Arbitrarily | | | | | |
| 22 | ∞ | 0.30 | 1.51680 | 64.20 | | | FM |
| 23 | ∞ | 0.50 | 1.50000 | 64.00 | | | |
| 24 | ∞ | | | | | | |

In Table 1, each of fifth, sixth, twelfth, fourteenth, fifteenth and nineteenth optical surfaces is aspheric and indicated by asterisk, and the parameters in the equation (16) for each aspheric surface are as follows. Aspheric surface parameters:
the 5th surface:
K=0
$A_4=9.77\times10^{-6}$
$A_6=-1.16\times10^{-8}$
$A_8=4.85\times10^{-12}$
$A_{10}=2.17\times10^{-13}$
$A_{12}=-8.30\times10^{-16}$
the sixth surface:
K=0
$A_4=1.75\times10^{-5}$
$A_6=-4.04\times10^{-6}$
$A_8=2.68\times10^{-7}$
$A_{10}=-8.19\times10^{-9}$
$A_{12}=1.13\times10^{-10}$
$A_{14}=-5.58\times10^{-13}$
The twelfth surface:
K=0
$A_4=-4.00\times10^{-4}$
$A_6=-5.98\times10^{-6}$
$A_8=1.41\times10^{-7}$
$A_{10}=-1.47\times10^{-8}$
the fourteenth surface:
K=0
$A_4=-2.24\times10^{-4}$
$A_6=1.74\times10^{-5}$
$A_8=2.56\times10^{-7}$
$A_{10}=5.34\times10^{-8}$
The fifteenth surface:
K=0
$A_4=7.37\times10^{-4}$
$A_6=3.90\times10^{-5}$
$A_8=2.55\times10^{-8}$
$A_{10}=1.70\times10^{-7}$
the nineteenth surface:
K=0
$A_4=-2.22\times10^{-5}$
$A_6=3.23\times10^{-6}$
$A_8=-1.30\times10^{-7}$
$A_{10}=2.28\times10^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table with changing the magnification.

TABLE 11

VARIABLE INTERVAL

| | WIDE ANGLE END | INTERMEDIATE FOCAL LENGTH | TELEPHOTO END |
|---|---|---|---|
| f | 5.10 | 16.28 | 51.98 |
| DA | 0.65 | 7.14 | 19.29 |
| DB | 13.80 | 2.58 | 0.80 |
| DC | 4.63 | 1.56 | 0.80 |
| DD | 2.03 | 4.44 | 17.56 |

Figure 18:
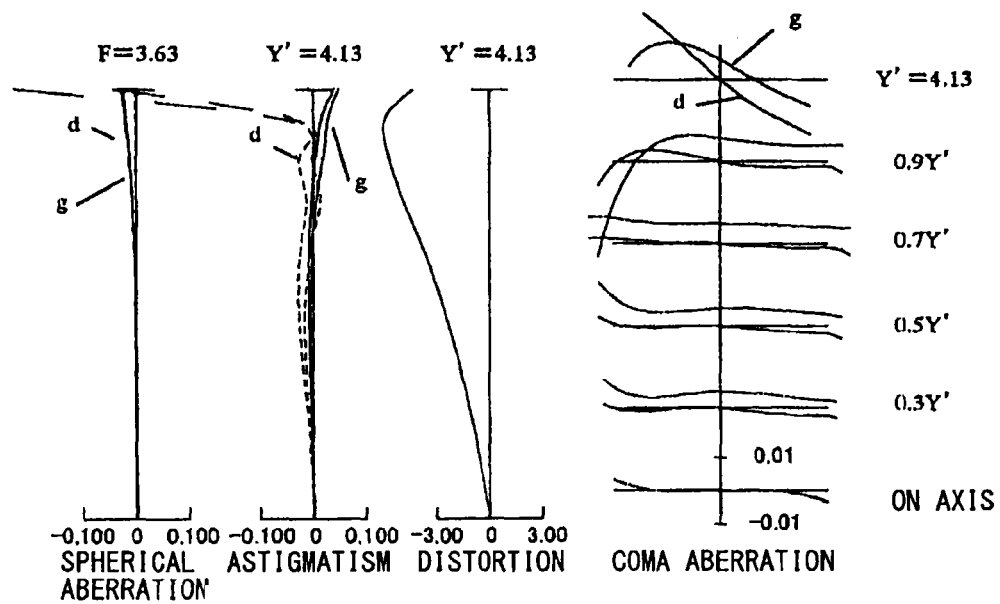
FIG. 18 is a view illustrating aberration curves of spherical aberration, astigmatism, distortion, and coma aberration in the zoom lens according to the example 5 at the wide angle end.
Figure 19:
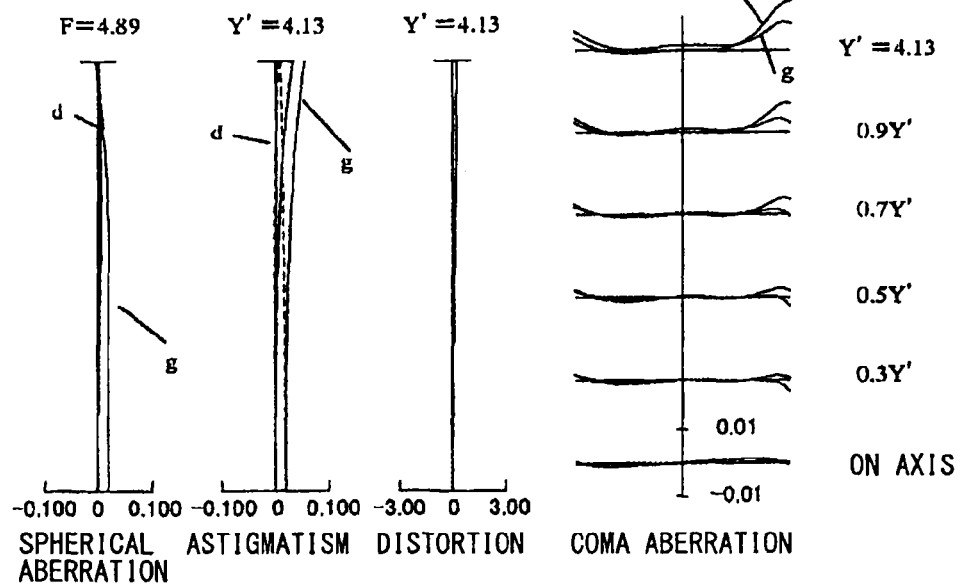
FIG. 19 is a view illustrating aberration curves of spherical aberration, astigmatism, distortion, and coma aberration in the zoom lens according to the example 5 at the intermediate focal length position.
Figure 20:
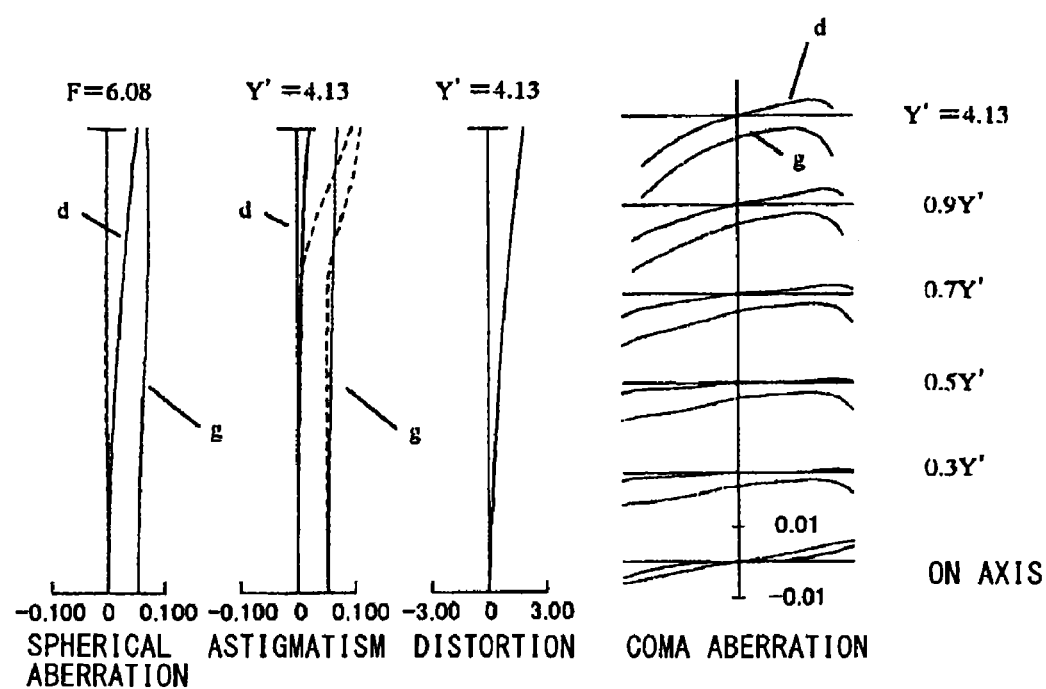
FIG. 20 is a view illustrating aberration curves of spherical aberration, astigmatism, distortion, and coma aberration in the zoom lens according to the example 5 at the telephoto end.

FIGS. 18, 19 and 20 show aberration curves of spherical aberration, astigmatism, distortion, and coma aberration at the wide angle end, the intermediate focal length position, and the telephoto end, respectively, in the zoom lens according to the example 5. In the spherical aberration curves in this example as well as the other examples, the broken line indicates a sine condition, in astigmatism curves, the solid line indicates a sagittal image plane, the broken line indicates a meridional image plane, the heavy line indicates a d-line, and the thin line indicates a g-line.

Example 6

The example 6 which is a second example of the second embodiment of the present invention is similar to the example previously explained as the example 2 of the first embodiment of the present invention and therefore as the explanation of the example 6, FIGS. 5 to 8, Tables 1 and 2 and the explanations thereof can be referred.

Example 7

The example 7 which is a third example of the second embodiment of the present invention is similar to the example previously explained as the example 3 of the first embodiment of the present invention and therefore as the explanation of the example 7, FIGS. 9 to 12, Tables 5 and 6 and the explanations thereof can be referred.

Example 8

The example 8 which is a fourth example of the second embodiment of the present invention is similar to the example previously explained as the example 4 of the first embodiment of the present invention and therefore as the explanation of the example 8, FIGS. 13 to 16, Tables 7 and 8 and the explanations thereof can be referred.

Example 9

Figure 21A:
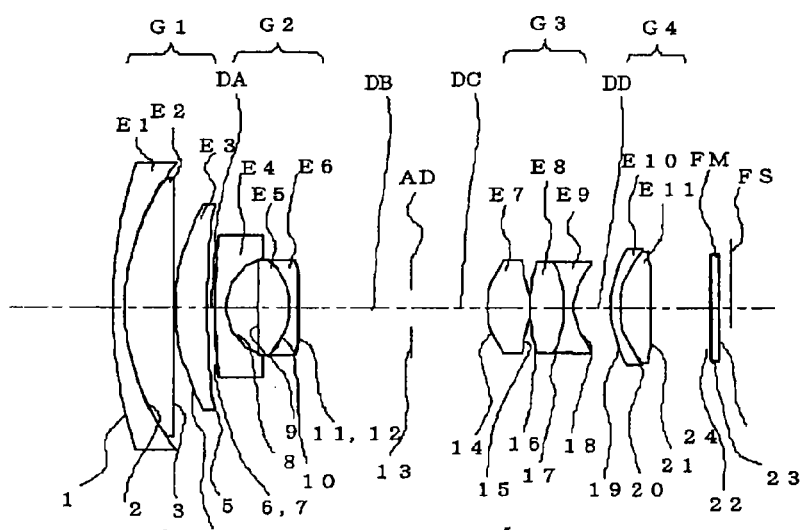
FIG. 21A is a schematic sectional view of a zoom lens according to an example 9 at a wide angle end.
Figure 21B:
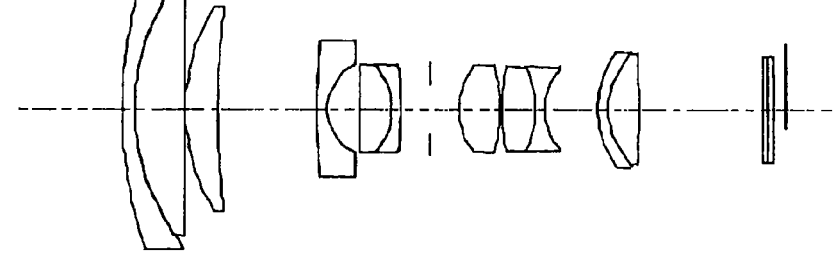
FIG. 21B is a schematic sectional view of the zoom lens according to the example 9 at a predetermined intermediate focal length position.
Figure 21C:
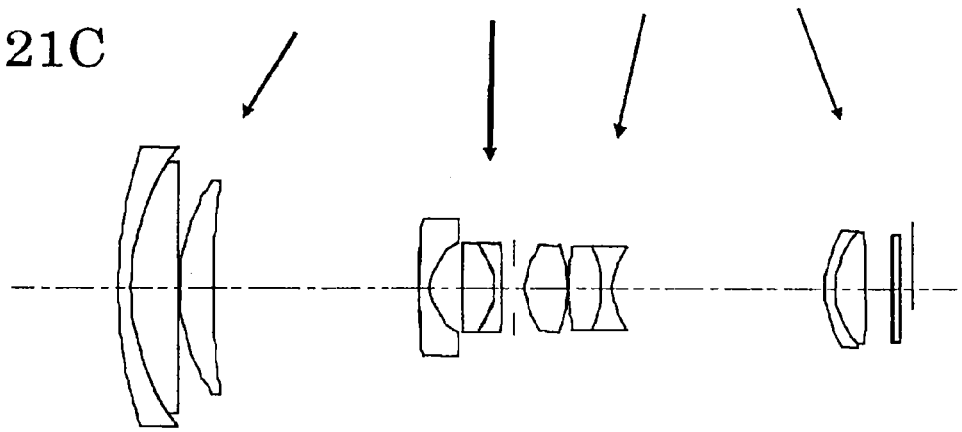
FIG. 21C is a schematic sectional view of the zoom lens according to the example 9 at a telephoto end.

FIG. 21A to 21C are schematic views of lens configurations of the zoom lens according to the example 5 of the second embodiment of the present invention on a zooming trajectory when zooming from a wide angle end to a telephoto end via a predetermined intermediate focal length position, that is, FIG. 21A is a schematic sectional view of the zoom lens at the wide angle end, FIG. 21B is a schematic sectional view of the zoom lens at the predetermined intermediate focal length position, and FIG. 21C is a schematic sectional view of the zoom lens at the telephoto end. A left side of FIGS. 21A to 21C is an object side of the zoom lens.

The zoom lens shown in FIG. 21A to 21C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group. FIGS. 21A to 21C show reference numbers of each surface. In addition, the same reference numbers are independently used in each example for sake of simplicity and therefore the configuration indicated by the same reference number is not always the same configuration.

When changing the magnification of the zoom lens from the wide angle end to the telephoto end, all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side, and the third lens E3 provided with a positive meniscus lens having a convex surface toward the object side and an aspheric surface at the image plane side in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens having an aspheric surface formed by applying a resin layer at the object side, the fifth lens E5 provided with a double-convex positive lens having a stronger convex surface at the image plane side, and the sixth lens E6 provided with an aspheric lens having an aspheric surface formed by applying a resin layer to an image plane side surface of a negative meniscus lens having a convex surface directed toward the image plane side, in order from the object side. The fifth and sixth lenses E5, E6 are closely stuck and cemented together with each other to form a cemented lens formed by the two lenses.

The third lens group G3 includes the seventh lens E7 provided with a double-convex and -aspheric positive lens having a stronger convex surface at the object side, the eighth lens E8 provided with a double-convex positive lens having a stronger convex surface at the image plane side, and the ninth lens E9 provided with a double-concave negative lens having a stronger concave surface at the image plane side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having an aspheric surface at the object side and a convex surface directed toward the object side, and the eleventh lens E11 provided with a double convex positive lens having a stronger convex surface directed toward the object side, in order from the object side. The tenth and eleventh lenses E10, E11 are closely stuck and cemented together with each other to form a cemented lens formed by the two lenses.

In this case, as shown in FIGS. 21A to 21C, the first and third lens groups G1 and G3 are moved from the image plane side to the object side, the second lens group G2 is moved along a trajectory curve which is convex toward the image plane side, and the fourth lens group G4 is moved along a trajectory curve which is convex toward the object side when changing the magnification of the zoom lens from the wide angle end to the telephoto end.

In this example 9, the focal length f of an entire optical system of the zoom lens, an F number F, and a half field angle ω are changed within a range of f=5.10 to 51.98, F=3.65 to 6.05, and ω=39.0 to 4.54, respectively. An optical property of each optical element is as follows:

TABLE 12

OPTICAL PROPERTIES

| Surface No. | R | D | $N_d$ | $v_d$ | NOTE | | |
|---|---|---|---|---|---|---|---|
| 1 | 42.154 | 1.00 | 2.00330 | 28.27 | | E1 | G1 |
| 2 | 21.129 | 3.89 | 1.60300 | 65.44 | | E2 | |
| 3 | 1016.745 | 0.10 | | | | | |
| 4 | 18.232 | 2.59 | 1.69680 | 55.53 | | E3 | |
| 5* | 75.224 | Variable DA | | | | | |
| 6* | 107.521 | 0.04 | 1.52020 | 52.02 | RESIN LAYER | E4 | G2 |
| 7 | 77.024 | 0.80 | 1.80610 | 40.93 | | | |
| 8 | 4.443 | 2.47 | | | | | |
| 9 | 178.228 | 2.57 | 1.76182 | 26.52 | | E5 | |
| 10 | −6.136 | 0.70 | 1.77250 | 49.60 | | E6 | |
| 11 | −35.883 | 0.04 | 1.52020 | 52.02 | RESIN LAYER | | |
| 12* | 516.028 | Variable DB | | | | | |
| 13 | Aperture stop | Variable DC | | | | AD | |
| 14* | 6.588 | 3.31 | 1.48749 | 70.24 | | E7 | G3 |
| 15* | −9.809 | 0.10 | | | | | |
| 16 | 18.892 | 2.65 | 1.69680 | 55.53 | | E8 | |
| 17 | −8.952 | 0.80 | 1.66680 | 33.05 | | E9 | |
| 18 | 5.666 | Variable DD | | | | | |
| 19* | 9.804 | 0.80 | 1.86400 | 40.58 | | E10 | G4 |
| 20 | 7.090 | 2.57 | 1.48749 | 70.24 | | E11 | |
| 21 | −53.006 | Arbitrarily | | | | | |
| 22 | ∞ | 0.30 | 1.51680 | 64.20 | | FM | |
| 23 | ∞ | 0.50 | 1.50000 | 64.00 | | | |
| 24 | ∞ | | | | | | |

In Table 12, each of fifth, sixth, twelfth, fourteenth, fifteenth and nineteenth optical surfaces is aspheric and indicated by asterisk, and the parameters in the equation (16) for each aspheric surface are as follows. Aspheric surface parameters:

the 5th surface:
$K=0$
$A_4=1.48\times10^{-6}$
$A_6=-5.78\times10^{-9}$
$A_8=6.08\times10^{-11}$
$A_{10}=-2.71\times10^{-13}$
$A_{12}=7.28\times10^{-16}$ the sixth surface:
$K=0$
$A_4=1.44\times10^{-4}$
$A_6=-6.09\times10^{-6}$
$A_8=2.75\times10^{-7}$
$A_{10}=-8.32\times10^{-9}$
$A_{12}=1.15\times10^{-10}$
$A_{14}=-5.58\times10^{-13}$ The twelfth surface:
$K=0$
$A_4=-7.01\times10^{-4}$
$A_6=-7.84\times10^{-7}$
$A_8=-9.78\times10^{-7}$
$A_{10}=-2.98\times10^{-8}$ the fourteenth surface:
$K=0$
$A_4=-6.69\times10^{-4}$
$A_6=1.98\times10^{-5}$
$A_8=-9.73\times10^{-7}$
$A_{10}=5.28\times10^{-8}$ The fifteenth surface:
$K=0$
$A_4=4.74\times10^{-4}$
$A_6=2.77\times10^{-5}$
$A_8=-1.53\times10^{-6}$
$A_{10}=9.10\times10^{-8}$ the nineteenth surface:
$K=0$
$A_4=1.65\times10^{-5}$
$A_6=1.45\times10^{-6}$
$A_8=-4.49\times10^{-8}$
$A_{10}=8.92\times10^{-10}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table with changing the magnification.

TABLE 13

VARIABLE INTERVAL

| | WIDE ANGLE END | INTERMEDIATE FOCAL LENGTH | TELEPHOTO END |
|---|---|---|---|
| f | 5.10 | 16.28 | 51.98 |
| DA | 0.64 | 7.90 | 16.46 |
| DB | 8.88 | 2.31 | 0.80 |
| DC | 6.15 | 2.29 | 0.95 |
| DD | 2.85 | 4.17 | 16.93 |

Figure 22:
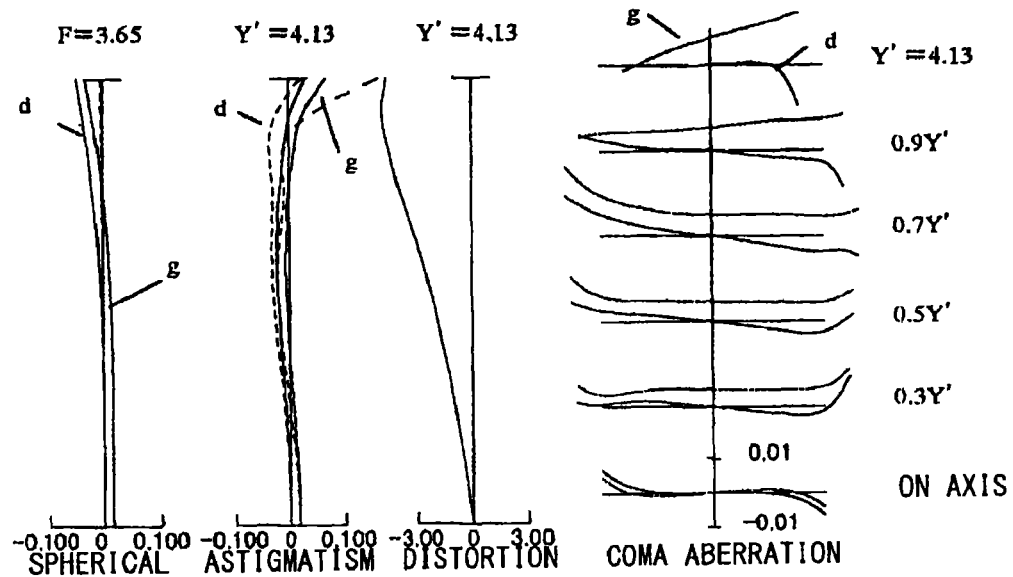
FIG. 22 is a view illustrating aberration curves of spherical aberration, astigmatism, distortion, and coma aberration in the zoom lens according to the example 9 at the wide angle end.
Figure 23:
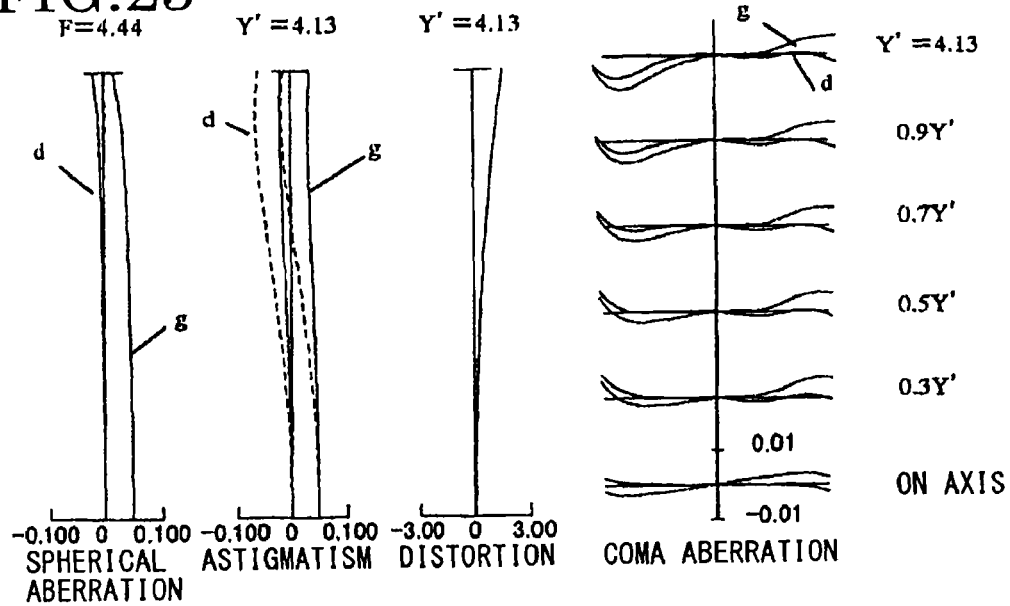
FIG. 23 is a view illustrating aberration curves of spherical aberration, astigmatism, distortion, and coma aberration in the zoom lens according to the example 9 at the intermediate focal length position.
Figure 24:
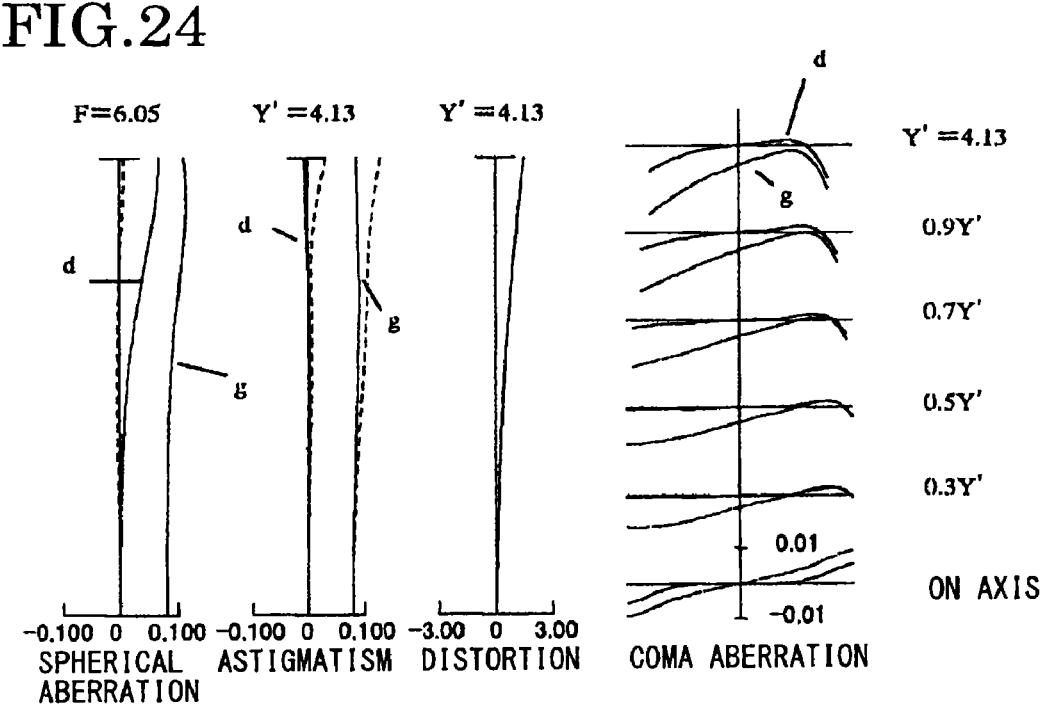
FIG. 24 is a view illustrating aberration curves of spherical aberration, astigmatism, distortion, and coma aberration in the zoom lens according to the example 9 at the telephoto end.

FIGS. 22, 23 and 24 show aberration curves of spherical aberration, astigmatism, distortion, and coma aberration at the wide angle end, the intermediate focal length position, and the telephoto end, respectively, in the zoom lens according to the example 9. In the spherical aberration curves in this example as well as in the other examples, the broken line indicates a sine condition, in astigmatism curves, the solid line indicates a sagittal image plane, the broken line indicates a meridional image plane, the heavy line indicates a d-line, and the thin line indicates a g-line.

Example 10

Figure 25A:
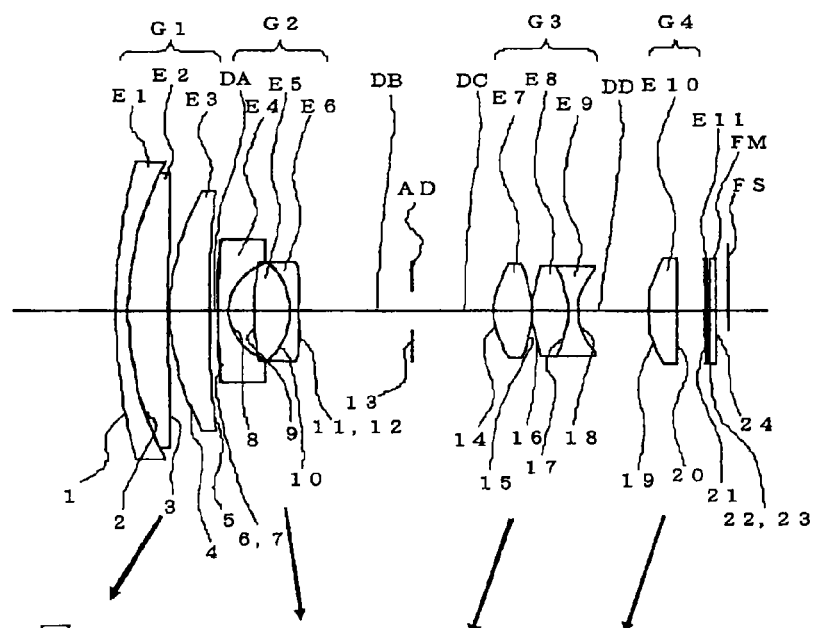
FIG. 25A is a schematic sectional view of a zoom lens according to an example 10 at a wide angle end.
Figure 25B:
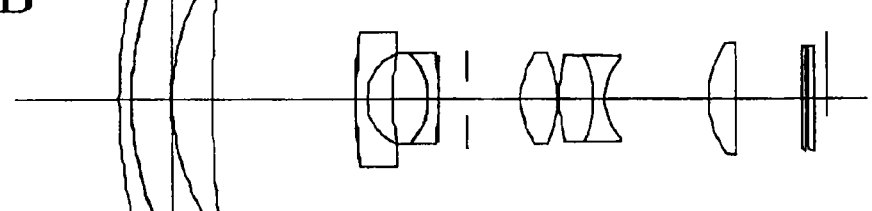
FIG. 25B is a schematic sectional view of the zoom lens according to the example 10 at a predetermined intermediate focal length position.
Figure 25C:
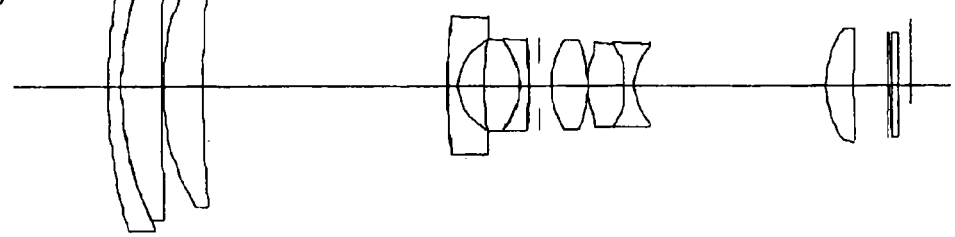
FIG. 25C is a schematic sectional view of the zoom lens according to the example 10 at a telephoto end.

FIG. 25A to 25C are schematic views of lens configurations of the zoom lens according to the example 6 of the second embodiment of the present invention on a zooming trajectory when zooming from a wide angle end to a telephoto end via a predetermined intermediate focal length position, that is, FIG. 25A is a schematic sectional view of the zoom lens at the wide angle end, FIG. 25B is a schematic sectional view of the zoom lens at the predetermined intermediate focal length position, and FIG. 25C is a schematic sectional view of the zoom lens at the telephoto end. A left side of FIGS. 21A to 21C is an object side of the zoom lens.

The zoom lens shown in FIG. 25A to 25C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. FIGS. 25A to 25C show reference numbers of each surface. In addition, the same reference numbers are independently used in each example for sake of simplicity and therefore the configuration indicated by the same reference number is not always the same configuration.

When changing the magnification of the zoom lens from the wide angle end to the telephoto end, all of the first to fourth lens groups G1 to G4 are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side, the second lens E2 provided with a positive meniscus lens having a convex surface directed toward the object side, and the third lens E3 provided with a positive meniscus lens having a convex surface toward the object side and an aspheric surface at the image plane side in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens having an aspheric surface formed by applying a resin layer at the object side, the fifth lens E5 provided with a double-convex positive lens having a stronger convex surface at the image plane side, and the sixth lens E6 provided with an aspheric lens having an aspheric surface formed by applying a resin layer to an image plane side surface of a negative meniscus lens having a convex surface directed toward the image plane side, in order from the object side. The fifth and sixth lenses E5, E6 are closely stuck and cemented together with each other to form a cemented lens formed by the two lenses.

The third lens group G3 includes the seventh lens E7 provided with a double-convex and -aspheric positive lens having a stronger convex surface at the object side, the eighth lens E8 provided with a double-convex positive lens having a stronger convex surface at the image plane side, and the ninth lens E9 provided with a double-concave negative lens having a stronger concave surface at the image plane side, in order from the object side. The eighth and ninth lenses E8, E9 are closely stuck and cemented together with each other to form a cemented lens formed by the two lenses.

The fourth lens group G4 is formed by only the tenth lens E10 provided with a negative meniscus lens having an aspheric surface at the object side and a convex surface directed toward the object side.

In this case, as shown in FIGS. 25A to 25C, the first and third lens groups G1 and G3 are moved from the image plane side to the object side, the second lens group G2 is moved from the object side to the image plane side, and the fourth lens group G4 is moved along a trajectory curve which is convex toward the object side when changing the magnification of the zoom lens from the wide angle end to the telephoto end.

In this example 10, the focal length f of an entire optical system of the zoom lens, an F number F, and a half field angle ω are changed within a range of f=5.10 to 52.51, F=3.59 to 6.02, and ω=39.0 to 4.54, respectively. An optical property of each optical element is as follows:

TABLE 14

OPTICAL PROPERTIES

| Surface No. | R | D | $N_d$ | $v_d$ | NOTE | |
|---|---|---|---|---|---|---|
| 1 | 52.544 | 1.02 | 1.80809 | 22.76 | E1 | G1 |
| 2 | 29.922 | 3.26 | 1.60300 | 65.44 | E2 | |
| 3 | 419.659 | 0.10 | | | | |
| 4 | 22.705 | 3.23 | 1.59240 | 68.30 | E3 | |
| 5* | 119.799 | Variable DA | | | | |
| 6* | 118.877 | 0.04 | 1.52020 | 52.02 | RESIN LAYER | E4 | G2 |
| 7 | 66.374 | 0.80 | 1.88300 | 40.76 | | |
| 8 | 4.687 | 2.08 | | | | |
| 9 | 26.044 | 2.85 | 1.74077 | 27.79 | E5 | |
| 10 | −6.220 | 0.70 | 1.77250 | 49.60 | E6 | |
| 11 | −80.115 | 0.04 | 1.52020 | 52.02 | RESIN LAYER | |
| 12* | 61.268 | Variable DB | | | | |
| 13 | Aperture stop | Variable DC | | | | AD |
| 14* | 6.734 | 3.00 | 1.50670 | 70.50 | E7 | G3 |
| 15* | −8.966 | 0.10 | | | | |
| 16 | 13.451 | 2.84 | 1.61800 | 63.33 | E8 | |
| 17 | −8.348 | 0.80 | 1.69320 | 33.70 | E9 | |
| 18 | 5.410 | Variable DD | | | | |
| 19* | 9.941 | 2.14 | 1.50670 | 70.50 | E10 | G4 |

TABLE 14-continued

OPTICAL PROPERTIES

| Surface No. | R | D | $N_d$ | $v_d$ | NOTE |
|---|---|---|---|---|---|
| 20 | 121.785 | Arbitrarily | | | |
| 21 | ∞ | 0.30 | 1.51680 | 64.20 | FM |
| 22 | ∞ | 0.10 | | | |
| 23 | ∞ | 0.50 | 1.50000 | 64.00 | |
| 24 | ∞ | | | | |

In Table 14, each of fifth, sixth, twelfth, fourteenth, fifteenth and nineteenth optical surfaces is aspheric and indicated by asterisk, and the parameters in the equation (16) for each aspheric surface are as follows. Aspheric surface parameters:

the 5th surface:
K=0
$A_4=1.96\times10^{-6}$
$A_6=1.38\times10^{-8}$
$A_8=-3.17\times10^{-10}$
$A_{10}=3.20\times10^{-12}$
$A_{12}=-1.53\times10^{-14}$
$A_{14}=2.74\times10^{-17}$ the sixth surface:
K=0
$A_4=2.16\times10^{-4}$
$A_6=-8.50\times10^{-6}$
$A_8=4.78\times10^{-7}$
$A_{10}=-1.88\times10^{-8}$
$A_{12}=3.62\times10^{-10}$
$A_{14}=-2.76\times10^{-12}$ The twelfth surface:
K=0
$A_4=-7.23\times10^{-4}$
$A_6=-1.05\times10^{-6}$
$A_8=-9.18\times10^{-7}$
$A_{10}=-2.55\times10^{-8}$ the fourteenth surface:
K=0
$A_4=-7.62\times10^{-4}$
$A_6=8.30\times10^{-6}$
$A_8=-6.42\times10^{-7}$
$A_{10}=3.58\times10^{-9}$ The fifteenth surface:
K=0
$A_4=3.62\times10^{-4}$
$A_6=7.90\times10^{-6}$
$A_8=-4.17\times10^{-7}$ the nineteenth surface:
K=0
$A_4=-1.82\times10^{-5}$
$A_6=7.83\times10^{-7}$
$A_8=4.92\times10^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table with changing the magnification.

TABLE 15

| | VARIABLE INTERVAL | | |
|---|---|---|---|
| | WIDE ANGLE END | INTERMEDIATE FOCAL LENGTH | TELEPHOTO END |
| f | 5.10 | 16.36 | 52.51 |
| DA | 0.64 | 11.64 | 19.99 |
| DB | 9.00 | 2.35 | 0.80 |
| DC | 6.61 | 4.24 | 0.95 |
| DD | 5.68 | 8.43 | 15.50 |

Figure 26:
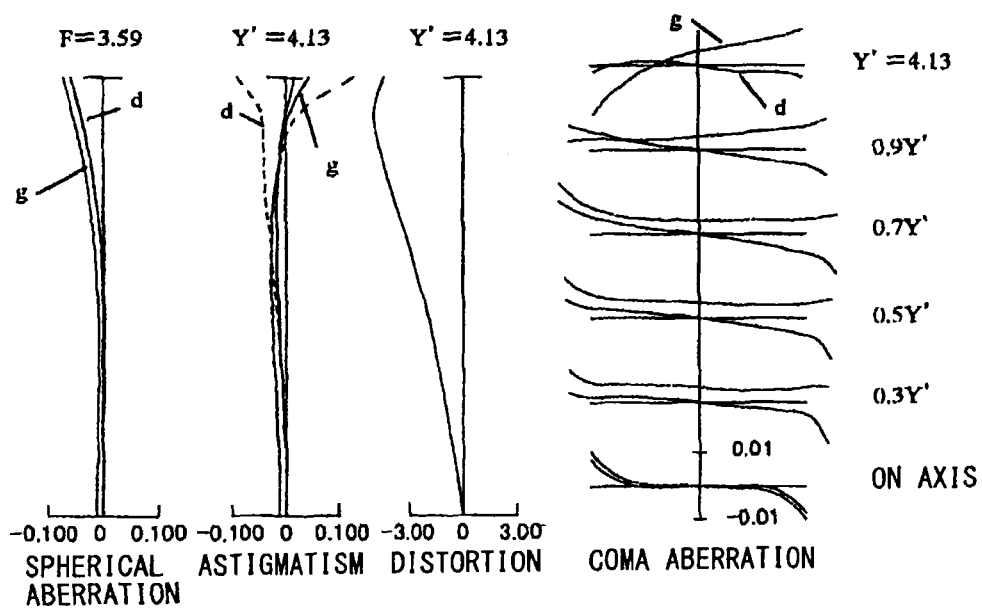
FIG. 26 is a view illustrating aberration curves of spherical aberration, astigmatism, distortion, and coma aberration in the zoom lens according to the example 10 at the wide angle end.
Figure 27:
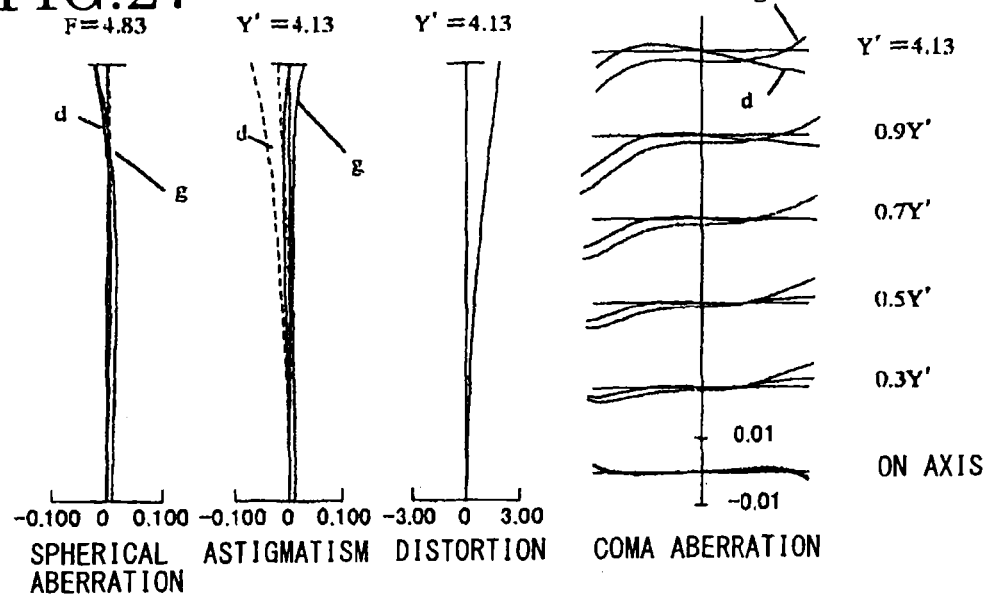
FIG. 27 is a view illustrating aberration curves of spherical aberration, astigmatism, distortion, and coma aberration in the zoom lens according to the example 10 at the intermediate focal length position.
Figure 28:
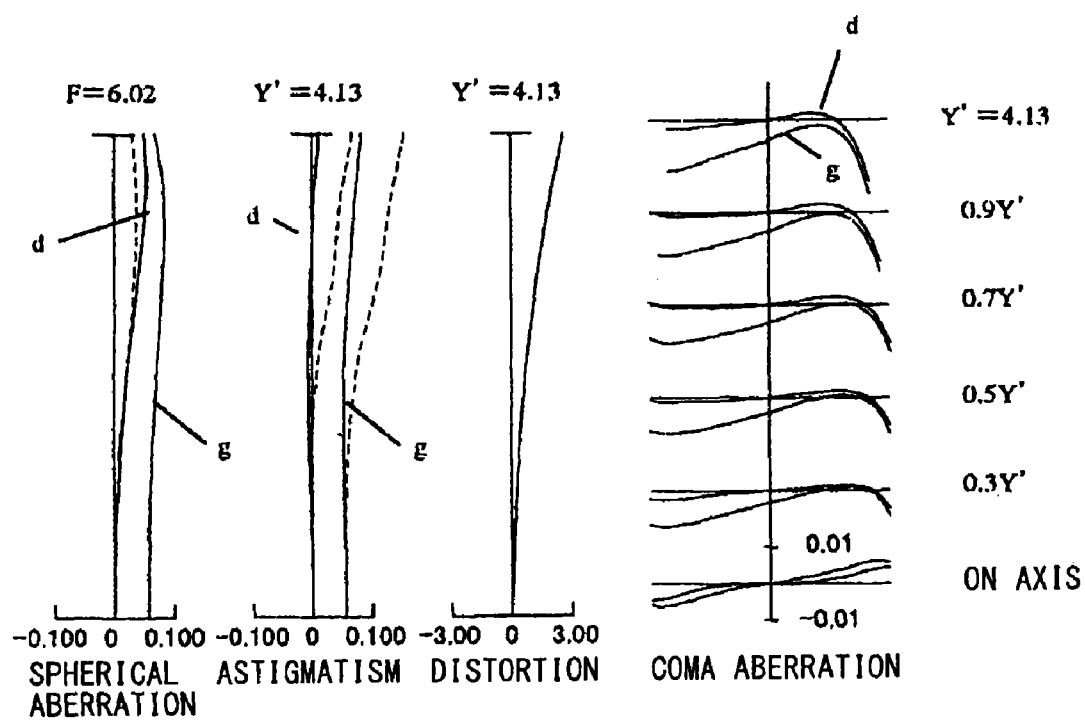
FIG. 28 is a view illustrating aberration curves of spherical aberration, astigmatism, distortion, and coma aberration in the zoom lens according to the example 10 at the telephoto end.

FIGS. 26, 27 and 28 show aberration curves of spherical aberration, astigmatism, distortion, and coma aberration at the wide angle end, the intermediate focal length position, and the telephoto end, respectively, in the zoom lens according to the example 10. In the spherical aberration curves in this example as well as in the other examples, the broken line indicates a sine condition, in astigmatism curves, the solid line indicates a sagittal image plane, the broken line indicates a meridional image plane, the heavy line indicates a d-line, and the thin line indicates a g-line.

The following table shows values of the conditions (4) to (9) according to the second embodiment in the examples 5 to 10. The values of the conditions are, more specifically, (β2t/β2w)/(β3t/β3w) of the condition (4), β2t/β2w of the condition (5), β3t/β3w of the condition (6), Tpr of the condition (7), ft/fw of the condition (8), and Y'/fw of the condition (9).

TABLE 16

| | Example 5 | Example 6 | Example 7 | Example 8 | Example 9 | Example 10 |
|---|---|---|---|---|---|---|
| Condition (4) | 2.11 | 2.12 | 2.74 | 2.72 | 3.18 | 1.92 |
| Condition (5) | 4.21 | 4.56 | 4.79 | 4.75 | 5.20 | 4.50 |
| Condition (6) | 1.99 | 2.16 | 1.75 | 1.74 | 1.63 | 2.35 |
| Condition (7) | 1.27 | 1.28 | 1.19 | 1.13 | 1.22 | 1.26 |
| Condition (8) | 10.19 | 10.30 | 10.19 | 10.19 | 10.19 | 10.30 |
| Condition (9) | 0.81 | 0.81 | 0.81 | 0.81 | 0.81 | 0.81 |

The above described values of the parameters according to the conditions (4) to (9) in the zoom lens of each example are within ranges of the conditions, respectively.

Example 11

The example 11 which is a first example of the third embodiment of the present invention is similar to the example previously explained as the example 1 of the first embodiment of the present invention and therefore as the explanation of the example 11, FIGS. 1 to 4, Tables 1 and 2 and the explanations thereof can be referred.

Here, the values of the parameters in the conditions (10) to (15) according to the above-described third embodiment in the example 11 are verified.

The values relating to these conditions are as follows:
fl=35.69
fw=5.1
ft=51.97
Lmax=66.72
D1=7.56
D2=6.64
Y'max=4.13
Tpr=1.28
L3max=30.77
Accordingly, the parameters of each condition are as follows and all conditions are satisfied:

| | |
|---|---|
| $fl/fw=7.0$ | the condition (10) |
| $((D1+D2)\times fw)/(Y'\max \times ft)=0.34$ | the condition (11) |
| $Tpr=1.28$ | the condition (12) |
| $(L\max \times fw)/(Y'\max \times ft)=1.59$ | the condition (13) |
| $L3\max/Y'\max=7.45$ | the condition (14) |
| $ft/fw=10.19$ | the condition (10) |

Example 12

The example 12 which is a second example of the third embodiment of the present invention is similar to the example previously explained as the example 2 of the first embodiment of the present invention and therefore as the explanation of the example 12, FIGS. 5 to 8, Tables 3 and 4 of the example 2 and the explanations thereof can be referred.

Here, the values of the parameters in the conditions (10) to (15) according to the above-described third embodiment in the example 12 are verified.

The values relating to these conditions are as follows:
fl=35.69
fw=5.1
ft=52.5
Lmax=67.14
D1=8.36
D2=6.41
Y'max=4.13
Tpr=1.28
L3max=30.37
Accordingly, the parameters of each condition are as follows and all conditions are satisfied:

| | |
|---|---|
| $fl/fw=7.0$ | the condition (10) |
| $((D1+D2)\times fw)/(Y'\max \times ft)=0.35$ | the condition (11) |
| $Tpr=1.28$ | the condition (12) |
| $(L\max \times fw)/(Y'\max \times ft)=1.58$ | the condition (13) |
| $L3\max/Y'\max=7.35$ | the condition (14) |
| $ft/fw=10.30$ | the condition (15) |

Example 13

The example 13 which is a third example of the third embodiment of the present invention is similar to the example previously explained as the example 3 of the first embodiment of the present invention and therefore as the explanation of the example 13, FIGS. 9 to 12, Tables 5 and 6 of the example 3 and the explanations thereof can be referred.

Here, the values of the parameters in the conditions (10) to (15) according to the above-described third embodiment in the example 13 are verified.

The values relating to these conditions are as follows:
fl=29
fw=5.1
ft=51.97
Lmax=62.73
D1=7.69
D2=6.52
Y'max=4.13
Tpr=1.20
L3max=30.85
Accordingly, the parameters of each condition are as follows and all conditions are satisfied:

| | |
|---|---|
| $fl/fw=5.69$ | the condition (10) |
| $((D1+D2)\times fw)/(Y'\max \times ft)=0.34$ | the condition (11) |
| $Tpr=1.2$ | the condition (12) |
| $(L\max \times fw)/(Y'\max \times ft)=1.49$ | the condition (13) |
| $L3\max/Y'\max=7.47$ | the condition (14) |
| $ft/fw=10.19$ | the condition (15) |

Example 14

The example 14 which is a fourth example of the third embodiment of the present invention is similar to the example previously explained as the example 4 of the first embodiment of the present invention and therefore as the explanation of the example 14, FIGS. 13 to 16, Tables 7 and 8 of the example 4 and the explanations thereof can be referred.

Here, the values of the parameters in the conditions (10) to (15) according to the above-described third embodiment in the example 14 are verified.

The values relating to these conditions are as follows:
fl=30.5
fw=5.1
ft=51.98
Lmax=58.71
D1=7.99
D2=6.27
Y'max=4.13
Tpr=1.13
L3max=26.59
Accordingly, the parameters of each condition are as follows and all conditions are satisfied:

| | |
|---|---|
| $fl/fw=5.98$ | the condition (10) |
| $((D1+D2)\times fw)/(Y'\max \times ft)=0.33$ | the condition (11) |
| $Tpr=1.13$ | the condition (12) |
| $(L\max \times fw)/(Y'\max \times ft)=1.39$ | the condition (13) |
| $L3\max/Y'\max=6.44$ | the condition (14) |
| $ft/fw=10.19$ | the condition (15) |

According to an embodiment of the present invention, it is possible to provide a zoom lens, an information device, and an imaging apparatus capable of sufficiently correcting aberrations with a sufficiently-wide field angle, that is, half field angle of 38 degrees or more at the wide angle end and with a highly-variable power ratio of 10 times or more as well as high resolution sufficient for using a small size and high resolution image pickup device having more than 5 to 10 million pixels.

That is, a zoom lens according to an embodiment of the present invention, includes a first lens group having a positive refracting power, a second lens group having a negative refracting power, a third lens group having a positive refracting power, and a fourth lens group having a positive refracting power, which are disposed in order from an object side to an image side; and an aperture stop disposed at an object side of the third lens group. The second lens group includes a negative lens, a positive lens, and a negative lens, which are disposed in order from the object side. When changing the magnification of the zoom lens from a wide angle end to a telephoto end, an interval between the first and second lens groups increases, an interval between the second and third lens groups decreases, and an interval between the third and fourth lens groups changes. The following conditions (1) and (2) are satisfied:

$$0.50 < fl/ft < 0.80; \quad (1)$$

$$vd1ave > 47, \quad (2)$$

where fl is a focal length of the first lens group, ft is a focal length of the zoom lens at the telephoto end, and vd1ave is an average Abbe number of the first lens group.

According to the above features, high optical performance as well as wide field angle and high variable power ratio can be achieved while achieving small size and sufficient correction of color aberration.

In the zoom lens according to an embodiment of the present invention, the following condition (3) is satisfied:

$$1.0 < Tpr < 1.5, \quad (3)$$

where Tpr is a telephoto ratio of an entire length at the telephoto end to the focal length of the zoom lens at the telephoto end, that is, Tpr=(the entire length at the telephoto end)/(the focal length of the zoom lens at the telephoto end).

Accordingly, further downsizing of the zoom lens can be achieved.

A zoom lens according to an embodiment of the present invention includes a first lens group having a positive refracting power, a second lens group having a negative refracting power, a third lens group having a positive refracting power, and a fourth lens group having a positive refracting power, which are disposed in order from an object side to an image side; and an aperture stop disposed at an object side of the third lens group. The second lens group includes a negative lens, a positive lens, and a negative lens, which are disposed in order from the object side. When changing the magnification of the zoom lens from a wide angle end to a telephoto end, an interval between the first and second lens groups increases, an interval between the second and third lens groups decreases, and an interval between the third and fourth lens groups changes. The following condition (4) is satisfied:

$$1.6 < (\beta 2t/\beta 2w)/(\beta 3t/\beta 3w) < 3.5, \quad (4)$$

where $\beta 2w$ is a lateral magnification of the second lens group at the wide angle end, $\beta 2t$ is a lateral magnification of the second lens group at the telephoto end, $\beta 3w$ is a lateral magnification of the third lens group at the wide angle end, and $\beta 3t$ is a lateral magnification of the third lens group at the telephoto end.

Accordingly, high optical performance as well as wide field angle and high variable power ratio can be achieved while achieving sufficiently small size and sufficient correction of color aberration.

In the zoom lens according to an embodiment of the present invention, the following conditions (5) and (6) are satisfied:

$$4.0 < \beta 2t/\beta 2w < 5.5; \quad (5)$$

$$1.5 < \beta 3t/\beta 3w < 3.5. \quad (6)$$

Accordingly, high performance can be achieved.

In the zoom lens according to an embodiment of the present invention, the following condition (7) is satisfied:

$$1.0 < Tpr < 1.5, \quad (7)$$

where Tpr is a telephoto ratio of an entire length at the telephoto end to the focal length of the zoom lens at the telephoto end, that is, Tpr=(the entire length at the telephoto end)/(the focal length of the zoom lens at the telephoto end).

Accordingly, further downsizing can be achieved.

In the zoom lens according to an embodiment of the present invention, at least one negative lens of the second lens group is a hybrid aspheric lens.

Accordingly, wide selection of glass material as well as high performance and low cost can be achieved.

In the zoom lens according to an embodiment of the present invention, the first lens group includes one negative lens and two positive lenses and has an aspheric surface at the most image side.

Accordingly, higher performance can be achieved.

In the zoom lens according to an embodiment of the present invention, the third lens group includes one negative lens and two positive lens and one lens disposed at the most object side has an aspheric surface.

Accordingly, higher performance can be achieved.

In the zoom lens according to an embodiment of the present invention, the fourth lens group includes at least one positive lens and at least one negative lens, and has an aspheric surface at the most object side.

Accordingly, higher performance can be achieved.

In the zoom lens according to an embodiment of the present invention, the fourth lens group includes at least one positive lens, and has an aspheric surface at the most object side.

Accordingly, higher performance can be achieved.

In the zoom lens according to an embodiment of the present invention, the following condition (8) is satisfied:

$$ft/fw > 7, \quad (8)$$

where ft is a focal length of the zoom lens at the telephoto end, and fw is a focal length of the zoom lens at the wide angle end.

Accordingly, high variable power ratio of 7 times or more can be obtained.

In the zoom lens according to an embodiment of the present invention, the following condition (9) is satisfied:

$$0.78 \leq Y'/fw \quad (9)$$

where Y' is a maximum image height, and fw is a focal length of the zoom lens at the wide angle end.

Accordingly, large half field angle of more than 38 degrees at the wide angle end can be obtained.

In the zoom lens according to an embodiment of the present invention, when changing the magnification of the zoom lens from the wide angle end to the telephoto end, the first and third lens groups are moved toward the object side, the second lens group is moved toward the image side, and the fourth lens group is moved on a trajectory in a curve convex toward the object side.

Accordingly, good correction of aberration can be achieved while achieving wide field angle, high variable power ratio, and sufficiently small size.

When an information device has an imaging function using the zoom lens according to an embodiment of the present invention as an imaging optical system, good correction of aberration can be achieved while achieving wide field angle, high variable power ratio, and sufficiently small size.

In the information device according to an embodiment of the present invention, an object image through the zoom lens is imaged on a light-receiving surface of an image pickup device.

Accordingly, photographed image can be obtained as digital information.

The information device according to an embodiment of the present invention is configured as a personal digital assistant.

Accordingly, good correction of aberration in a photographed image can be achieved while achieving wide field angle, high variable power ratio, and sufficiently small size.

A zoom lens according to an embodiment of the present invention includes a first lens group having a positive refracting power, a second lens group having a negative refracting power, a third lens group having a positive refracting power, and a fourth lens group having a positive refracting power, which are disposed in order from an object side to an image side; and an aperture stop disposed between the second and third lens groups. When changing the magnification of the zoom lens from a wide angle end to a telephoto end, an interval between the first and second lens groups increases, an interval between the second and third lens groups decreases, and an interval between the third and fourth lens groups increases. The first lens group includes a negative lens, a positive lens, and a positive lens, which are disposed in order form the object side, the second lens group includes a negative lens, a positive lens, and a negative lens, which are disposed in order from the object side, and the fourth lens group includes at least one positive lens and at least one negative lens. The following condition (10) is satisfied:

$$5 < fl/fw < 8, \quad (10)$$

where fl is a focal length of the first lens group and fw is a focal length of the zoom lens at the wide angle end.

Accordingly, it is possible to achieve sufficiently correction of aberrations as well as a sufficiently-wide field angle, that is, half field angle of 38 degrees or more at the wide angle end and with a highly-variable power ratio of 10 times or more. And then, high resolution sufficient for using a small size and high resolution image pickup device having more than 5 to 10 million pixels can be provided.

In the zoom lens according to an embodiment of the present invention, the most image side positive lens of the first lens group has an aspheric surface.

Accordingly, good correction of aberration such as distortion can be achieved.

In the zoom lens according to an embodiment of the present invention, the following conditions (11) to (13) are satisfied:

$$0.2 < ((D1+D2) \times fw)/(Y'max \times ft) < 0.5; \quad (11)$$

$$0.9 < Tpr < 1.5; \quad (12)$$

$$1 < (Lmax \times fw)/(Y'max \times ft) < 2, \quad (13)$$

where fw is a focal length of the zoom lens at the wide angle end, ft is a focal length of the zoom lens at the telephoto end, D1 is a thickness of the first lens group on an optical axis, D2 is a thickness of the second lens group on the optical axis, Y'max is a maximum image height, Tpr is a telephoto ratio of an entire length at the telephoto end to the focal length of the zoom lens at the telephoto end, that is, Tpr=(the entire length at the telephoto end)/(the focal length of the zoom lens at the telephoto end), and Lmax is a maximum distance from the most object side surface to an image plane within an entire focal range.

Accordingly, the aberration can be sufficiently corrected by a compact configuration.

In the zoom lens according to an embodiment of the present invention, the following condition (14) is satisfied:

$$6 < L3max/Y'max < 8, \quad (14)$$

where L3max is a maximum distance from the most object side surface of the third lens group to an image plane within an entire focal range; and Y'max is a maximum image height.

Accordingly, the aberration can be sufficiently corrected by a compact configuration.

In the zoom lens according to an embodiment, the following condition (15) is satisfied:

$$ft/fw > 7, \quad (15)$$

where ft is a focal length of the zoom lens at the telephoto end, and fw is a focal length of the zoom lens at the wide angle end.

Accordingly, high variable power ratio can be achieved.

When an imaging apparatus has the zoom lens according to an embodiment as an imaging optical system, at least one of the third and fourth lens groups of the zoom lens is configured to be retracted from an optical axis of the zoom lens when the zoom lens is in a collapsed state.

Accordingly, further improved compact device can be achieved by using a zoom lens capable of sufficiently correcting aberration with high variable power ratio.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A zoom lens comprising:
    a first lens group having a positive refracting power, a second lens group having a negative refracting power, a third lens group having a positive refracting power, and a fourth lens group having a positive refracting power, which are disposed in order from an object side to an image side; and
    an aperture stop disposed at an object side of the third lens group,
    the second lens group including a negative lens, a positive lens, and a negative lens, which are disposed in order from the object side,
    wherein when changing the magnification of the zoom lens from a wide angle end to a telephoto end, an interval between the first and second lens groups increases, an interval between the second and third lens groups decreases, and an interval between the third and fourth lens groups changes; and
    the following conditions (1) and (9) are satisfied:

$$0.50 < fl/ft < 0.80; \quad (1)$$

$$0.78 \leq Y'/fw, \quad (9)$$

where fl is a focal length of the first lens group, ft is a focal length of the zoom lens at the telephoto end, Y' is a maximum image height, and fw is a focal length of the zoom lens at the wide angle end,
    wherein as the magnification of the zoom lens changes from the wide angle end to the telephoto end, the first and third lens groups are moved toward the object side, the second lens group is moved toward the image side, and the fourth lens group is moved on a trajectory in a curve convex toward the object side.

2. The zoom lens according to claim 1, wherein the following condition (2) is satisfied:

$$vd1ave > 47, \qquad (2)$$

where vd1ave is an average Abbe number of the first lens group.

3. The zoom lens according to claim 1, wherein the following condition (3) is satisfied:

$$1.0 < Tpr < 1.5, \qquad (3)$$

where Tpr is a telephoto ratio of an entire length at the telephoto end to the focal length of the zoom lens at the telephoto end, that is, Tpr=(the entire length at the telephoto end)/(the focal length of the zoom lens at the telephoto end).

4. The zoom lens according to claim 1, wherein at least one negative lens of the second lens group is a hybrid aspheric lens.

5. The zoom lens according to claim 1, wherein
the first lens group includes one negative lens and two positive lenses and has an aspheric surface at the most image side.

6. The zoom lens according to claim 1, wherein the third lens group includes one negative lens and two positive lenses and one lens disposed at the most object side has an aspheric surface.

7. The zoom lens according to claim 1, wherein the fourth lens group includes at least one positive lens, and has an aspheric surface at the most object side.

8. The zoom lens according to claim 1, wherein the following condition (8) is satisfied:

$$ft/fw > 7, \qquad (8)$$

where ft is a focal length of the zoom lens at the telephoto end, and fw is a focal length of the zoom lens at the wide angle end.

9. An information device having an imaging function using the zoom lens according to claim 1 as an imaging optical system.

* * * * *